United States Patent [19]
Barnsley et al.

[11] Patent Number: 5,864,414
[45] Date of Patent: Jan. 26, 1999

[54] WDM NETWORK WITH CONTROL WAVELENGTH

[75] Inventors: Peter E. Barnsley, Felixstowe; Alan McGuire, Hacheston, both of Great Britain; Hideaki Tsushima, Tokyo, Japan

[73] Assignees: British Telecommunications public limited company, London, England; Hitachi Limited, Tokyo, Japan

[21] Appl. No.: 686,962

[22] Filed: Jul. 26, 1996

Related U.S. Application Data

[63] Continuation of PCT/GB95/00159, Jan. 26, 1995, which is a continuation-in-part of Ser. No. 216,876, Mar. 24, 1994.

[30] Foreign Application Priority Data

Jan. 26, 1994 [GB] United Kingdom .................... 9401488

[51] Int. Cl.⁶ .................................................. H04J 14/02
[52] U.S. Cl. ............................ 359/125; 359/110; 359/119
[58] Field of Search ..................................... 359/124, 125, 359/119, 120, 110; 370/222, 223, 224, 226

[56] References Cited

U.S. PATENT DOCUMENTS

| | | | |
|---|---|---|---|
| 4,715,026 | 12/1987 | Eberspaecher | 359/119 |
| 5,069,521 | 12/1991 | Hardwick | 359/110 |
| 5,229,875 | 7/1993 | Glista | 359/110 |
| 5,394,389 | 2/1995 | Kremer | 370/223 |
| 5,442,623 | 8/1995 | Wu | 370/16.1 |
| 5,539,564 | 7/1996 | Kumozaki et al. | 359/161 |
| 5,625,478 | 4/1997 | Doerr et al. | 359/125 |

*Primary Examiner*—Rafael Bacares
*Attorney, Agent, or Firm*—Nixon & Vanderhye P.C.

[57] ABSTRACT

A wavelength division multiplex communication system comprises a head station (2) and a plurality of terminal stations (1) interconnected by an optical fibre cable (3). The head station (2) transmits continuous wave modulated wavelengths ($\lambda_1$–$\lambda_k$), and a signalling wavelength ($\lambda_0$) which is used to indicate, in each time slot, which wavelengths in the following time slot are available for transmission. Each terminal station (1) is arranged to receive the signalling wavelength, to determine therefrom whether the next time slot contains any data packets for that terminal station and, if so, to receive the packets. The terminal station (1) is arranged, if it has a data packet to transmit, to determine from the signalling wavelength whether the next time slot already contains data packets for the destination station and, if so, to avoid data collision by not transmitting its own data packet. The terminal station (1) then determines a free wavelength ($\lambda_q$) from the signalling wavelength ($\lambda_0$), modulates the free wavelength with the data packet it is to transmit, and modifies the signalling wavelength.

8 Claims, 21 Drawing Sheets

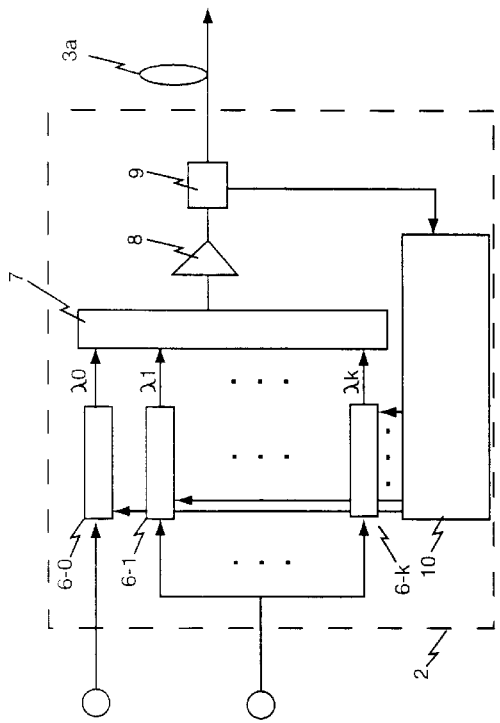
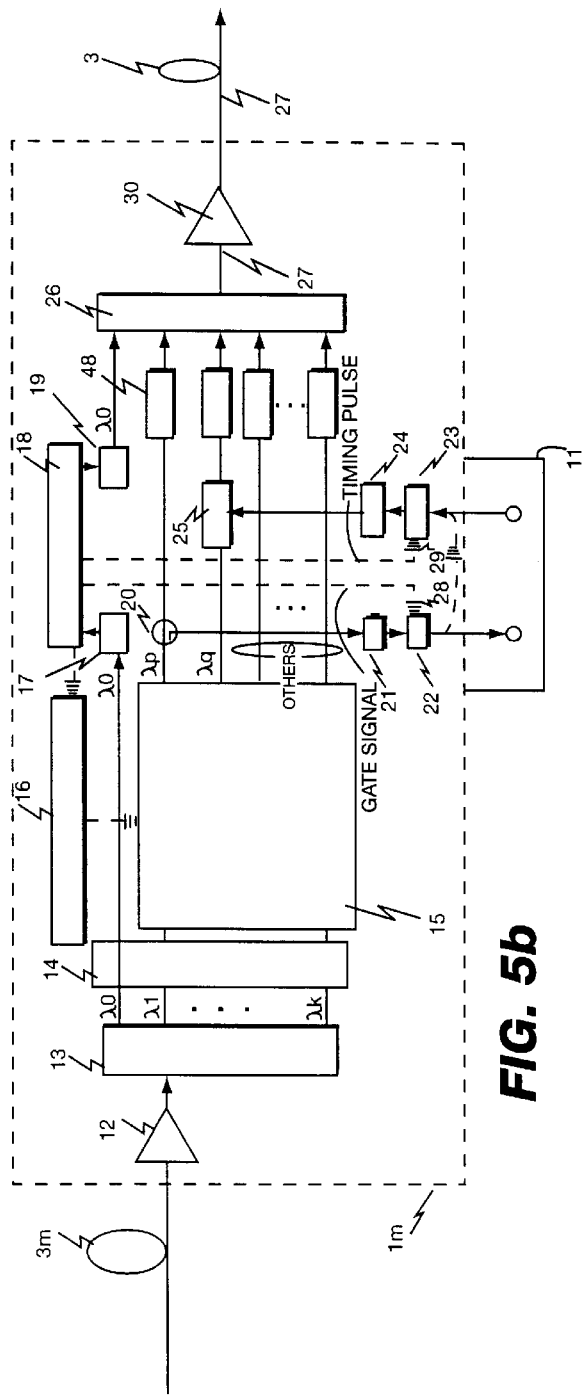
FIG. 5a
FIG. 5b

WDM NETWORK WITH CONTROL WAVELENGTH

This is a continuation of PCT application PCT/GB95/00159, filed 26 Jan. 1995, and a continuation in part of Ser. No. 8/216,876 filed Mar. 24, 1994.

1. Field of the invention

This invention relates to an optical communications system, and to terminal equipment forming part of such a system. More particularly, this invention relates to an optical communications system comprising a plurality of terminals, interconnected by a light path (particularly but not exclusively, an optical fibre cable) and arranged to signal using selected wavelengths from a plurality of possible simultaneous signalling wavelengths.

2. Background Art

Optical communications systems are suitable for applications in which large volumes of data are to be communicated between stations, such as local area networks (LANs), or Metropolitan area networks (MANs). It is known to provide such networks using optical fibre cable to interconnect network stations, and signalling on selected ones of a plurality of wavelengths using wavelength division multiplexing, or (WDM)

One example of such a system, and specifically a terminal station, for such a system, is described in the Proceedings of the Nineteenth European Conference on optical communication (ECOC'93) Volume 2, paper TuP4.4, pages 121–124, Sep. 12–16 1993, I Chlamtac et al "A Multi-Gbit/s WDM Optical Packet Network with Physical Ring Topology and Multi-subcarrier Header Encoding". In the system there described, each terminal station consists of a laser tuned to operate at a single discrete frequency (different to the frequencies of all other lasers of all other stations in the system), a subcarrier receiver tuned to operate at a single discrete subcarrier frequency (different to the frequencies of all other receivers of all other stations in the system), and a tuneable wavelength selector capable of selectively tuning to any of the transmitter wavelengths. All the stations are connected by a single optical fibre cable. Data is communicated in packets, all having the same predetermined length. When a station wishes to transmit a packet, it transmits a header on the subcarrier of the station to which the packet is to be sent, and then sends the data on its transmit wavelength by using its laser diode, the output of which is then coupled to the fibre. At the destination station, the header on a subcarrier is detected. The header includes an indication of the transmitting station, and therefore the transmitting wavelength, and this is used to tune the wavelength selector to the correct receiving wavelength, and the packet is received ("dropped") via the wavelength selector.

Because of the high bandwidth of optical fibres (or optical paths in general), it is possible to provide a reasonably large number of stations each operating at a high data rate using this type of wavelength multiplexing system.

Further, because every station has its own transmit wavelength, there is no possibility of collision between data from different stations on the same wavelength.

However, the system does have several drawbacks. Firstly, it requires every station to have a different transmitting frequency, and this means either manufacturing a very large number of fixed frequency laser diodes of different frequencies, or providing a tunable laser at every station (which would require accurate wavelength stabilisation equipment at each station to avoid cross-talk between wavelengths). The same applies to the need for a separate subcarrier receiver for each station. Finally, the total number of stations must inevitably be limited to the total number of available wavelengths (and/or subcarriers)

A similar WDM system having stations provided on a bus, each having a fixed frequency receiver and a tunable transmitter is disclosed in Journal of Lightwave Technology, vol.11, no. 5/6, May 1993, New York US, pages 1104–1111, XP396738, S. Banerjee et al. 'FairNet: A WDM-based Multiple Channel Lightwave Network with Adaptive and Fair Scheduling Policy'.

A WDM system in which terminal stations utilise wavelength multiplexers and demultiplexers is disclosed in IEEE infocom' 90, 3 Jun. 1990, San Francisco US, pages 1030–1037, K. Yamaguchi et al, 'A Broadband Access Network Based on Optical Signal Processing: The Photonic Highway'.

A star-connected WDM system is described in optoelectronic Interconnects, vol. 1849, 18 Jan. 1993, Los Angeles US, pages 172–183, K. Ghose 'Performance Potentials of an Optical Fiber Bus using Wavelength Division Multiplexing'. In this system, each station has a fixed transmission frequency (shared by several stations) and a receiver which receives all frequencies.

EP 0497005 discloses a WDM system in which terminal stations are provided on a ring bus. A supervisory station is also provided. Each terminal station has a fixed Frequency light source and receiver operating at a control wavelength, a tunable light source, and a receiver with a tunable optical filter.

Each terminal station wishing to transmit sends a reservation signal on the control channels and the supervisory station checks for conflicts, allocates a signalling wavelength, and sends a signal indicating the wavelength to the transmitting and receiving terminal stations via the control channel.

IEEE Communications Magazine, vol. 31, no 2, February 1993, New York US, pages 78–88, XP334606, R. Ramaswami 'Multiwavelength Lightwave Networks for Computer Communication', is a review paper disclosing various WDMA protocols. Of these protocols, DT-WDMA is stated to provide terminal stations each having a fixed-wavelength light source and a tunable receiver. A common signalling wavelength is used by each terminal station to indicate subsequent transmission of data on the terminal's fixed transmission wavelength. This arrangement would lead to destination conflict, and so an arbitration algorithm is required. It is stated that, in this class of WDM network, typically at least as many wavelengths as there are terminal stations required.

Journal of Lightwave Technology, vol. 10, no. 11, November 1992, New York US, pages 1688–1699, XP355283, K. Boginemi et al, 'A Collisionless Multiple Access Protocol for a Wavelength Division Multiplexed Star-Coupled Configuration: Architecture and Performance Analysis' discloses a WDM network coupled in a passive star configuration, comprising a plurality of star-connected terminal stations each employing a tunable optical transmitter and a tunable optical receiver, together with a fixed optical receiver for monitoring a common control channel. The access protocol is referred to as 'TDMA-C'. Each terminal station transmits an indication on the control channel of a future data packet transmission on one of the WDM wavelengths. All terminal stations monitor the control channel, to detect messages intended for themselves, and to avoid channel conflict or destination conflict.

EP 0452895 discloses an optical network system which comprises a plurality of terminal stations interconnected by an optical fibre cable. In a first embodiment, a base station transmits a plurality of different wavelengths. A first wavelength variable filter continually scans all the wavelengths, to attempt to find a free wavelength. When a free wavelength is found, the current setting of the first wavelength variable filter is used to set a second wavelength variable filter which extracts the free wavelength. The extracted free wavelength is modulated by an optical modulator, and recombined with the other wavelengths in a multiplexer. The initial part of the data transmitted by the modulator is an indication of the destination station for the data. All stations, therefore, also scan all the wavelengths to attempt to locate such a header indicating that data is addressed to them. When such a header is located, the second wavelength variable filter is set to the wavelength on which the header occurred, and the subsequent data is demodulated using a photosensor.

In the second embodiment, the method of reception of data is as in the first embodiment. The method of transmission of the data from a station differs, however, in that, instead of using an optical modulator to modulate the extracted free wavelength, two laser diodes are employed to generate free wavelengths which are modulated by optical modulators and multiplexer into the signals on the optical fibre. As before, a wavelength variable fitter sweeps the available wavelengths to search for a free wavelength, and the laser diodes are set to the or each free wavelength. The laser diodes are stabilised by the transmission, from the base station, of a reference wavelength which is extracted by a separate wavelength variable filter, and used to control the laser diodes at each station.

Both embodiments thus avoid the need for every station to have a different transmitting frequency and a different receiving frequency, and hence either large numbers of laser diodes or temperature stabilisation at each station (although, in the second embodiment, some wavelength stabilisation circuitry is needed).

However, this is achieved only by sacrificing a major advantage of the Chlamtac system above; namely, its immunity from collision. In the system of EP 0452895, collision is highly likely because all stations are simultaneously scanning the free wavelengths in order to be able to transmit data. Thus, several stations may simultaneously detect that the same wavelength is free, and attempt to transmit data at the same time. Obviously, in this instance, all the transmitted data on that wavelength will become corrupted. For this purpose, EP 0452895 proposes to use the transmission protocol known as carrier sense multiple access/collision detection (CSMA/CD), in which stations detect collision of data and attempt re-transmission. However, this in turn can lead to repeated collisions, as the re-transmissions themselves collide; and, in any case, leads to delay in the transmission of data, and the need for further complicated circuitry to deal with the control of the collision protocols.

Furthermore, because each station needs continually to scan all frequencies to determine the wavelength on which data for that station may be transmitted, the rate of transmission is limited by the rate to scanning of the wavelength variable filter and the number of wavelengths to be scanned; since, if a destination indicating header is only scanned part way through, the receiving station may not correctly decode the destination, and accordingly may not decode the signal. For this reason, some form of acknowledgment signalling, and associated re-transmission of data, would appear to be increasingly necessary as the speed of transmission or the number of wavelengths employed in this system increases.

SUMMARY OF THE INVENTION

In one aspect, the present invention provides a wavelength division multiplex transmission system utilising a plurality of data transmission wavelengths, and a dedicated control channel (which may be on a predetermined one of said wavelengths, which may be separate of all said data transmission wavelengths) in which a plurality of terminal stations are each arranged to signal forthcoming transmissions of data on one of the data transmission wavelengths by a signal on the dedicated control channel, and to respond to signals on the dedicated control channel to initiate reception of a signal, in which a head station is provided which comprises a light source generating a wavelength division multiplexed optical signal including said plurality of data transmission wavelengths, and each of the terminal station consists of a modulator arranged to modulate a selected said data transmission wavelength.

Thus it is possible to provide a wavelength multiplexed communications network in which the number of stations is not limited by the number of wavelengths employed, and the number of light sources required in the system is not limited by the number of stations present. For example, it had been calculated to be possible to provide 1000 terminal stations using only four different data transmission wavelengths supported by a single head station comprising four light sources. This is to be compared with the above referenced prior art systems, where for DT-WMDA 1000 different signalling wavelengths (and hence differently tuned transmitters) would be required, and for TDMA-C 1000 different tunable transmitters (one at each station) would be required. Thus, the need for expensive wavelength stabilisation equipment at every terminal station is avoided, and the channel degradation caused by wavelength inaccuracy is reduced. Further, it is possible to co-locate the light sources at one head station (or a small number of head stations), which increased the ease with which wavelength stabilisation may be performed. At the same time, communication is conducted in a deterministic fashion, and collision can be substantially avoided. The stations are not required to have a tunable receiver arranged continually to scan all available wavelengths of a plurality of wavelengths, or a separately tuned subcarrier receiver.

In another aspect (which is preferably employed in the first aspect) each terminal station or a WDMA network includes a wavelength separator means and an optical switching means arranged to switch a selected wavelength from the wavelength separator means to an optical data sender (for example a modulator) or receiver.

Thus, in this aspect, wavelength demultiplexing and switching technology is employed rather than a wavelength-tunable filter to route the selected wavelength to and from a receiver or sender. Such demultiplexing and switching technology is stable, and fast in operation compared to several types of tunable optical filter.

In another aspect, the invention provides a WDM network in which terminal stations are linked by a bus (which may be connected in a ring) consisting of a first optical bus carrying light in a first direction to the sequence or terminal stations along the bus, and a second optical bus carrying light in the reverse direction along the sequence of terminal stations, each terminal station having a first side for communicating with the first bus and a second side for communicating with the second bus.

Thus, signalling access by a terminal station at one end of the bus is as good as access at the other end of the bus where, for example, a signalling protocol as in the first embodiment or the invention enables successive terminal stations in the bus to progressively reserve wavelengths.

A terminal station for a bus of this kind preferably comprises, in a further aspect of the invention, a cross connection means for linking the two buses. Thus, in the event of failure of one or more or the buses, or one or more of the terminal stations, the network can be reconfigured to connect the two buses as a single looped bus at one or both sides of the failure.

In a yet further aspect of the invention, a plurality of bus structures (for example according to earlier aspects of the invention) are connected to share common light sources (i.e. the buses are connected in a star configuration).

Thus, the number of light sources required to operate a very large number of terminals is reduced yet further. Preferably, in this embodiment, separate buses are arranged to communicate with each other via one or more lateral connection optical buses.

According to a further aspect of the invention, a connection station for interconnecting two optical buses consists of a first optical add/drop terminal in communication with a first of the buses and a second optical add/drop terminal in communication with a second of the buses, each of the terminals having an electrical input port and an electrical output port, in which the electrical input port or one terminal station is electrically cross connected to the electrical output port of the other, and vice versa.

By providing electrical interconnection between the two terminal stations, the requirement for an optical memory buffer to buffer data passing between the two buses is avoided.

Other aspects, embodiments and preferred features of the invention are substantially as described or claimed hereafter.

BRIEF DESCRIPTIONS OF THE DRAWINGS

The invention will now be described in greater detail, by way of example, with reference to the accompanying drawings, in which:

FIG. 5a is a block diagram corresponding to FIG. 2a, and showing a head station of the first embodiment in generalised form;

FIG. 5b is a block diagram corresponding to FIG. 2b, and showing a terminal station of the first embodiment in generalised form;

DESCRIPTION OF THE PREFERRED EMBODIMENTS

First Embodiment

Figure 1:
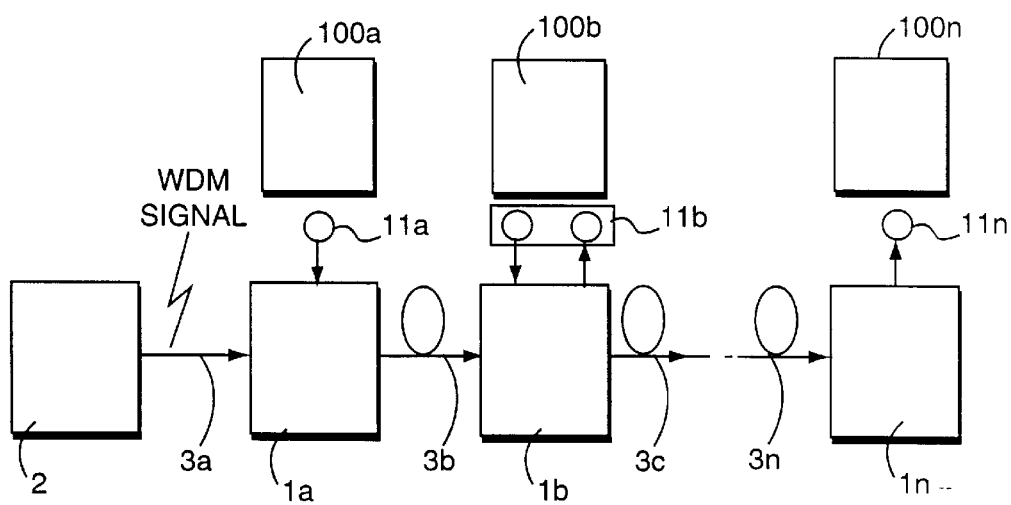
FIG. 1 is a block diagram showing schematically a bus arrangement of a first embodiment of the invention.

Referring to FIG. 1, in a first embodiment, a wavelength division multiplex (WDM) local area network (LAN) system comprises a plurality of terminal stations 1a, 1b, ... 1n and head station 2. The head station 2 and the terminal stations 1 are connected in a chain configuration by an optical cable 3 comprising lengths of optical fibre 3a, 3b, 3c. . . In this embodiment, each station 1 is capable of passing data to each downstream station. Thus, this embodiment is useful where the terminal station 1a nearest to the head station 2 is to broadcast data to all other stations 1b ... 1n; or where a plurality of stations 1a, 1b ... are all to transmit data to a single station in (the furthest from the head station 2), as for example where a number of sensors are to communicate data to a data logging station, or where a plurality of computer terminals are to communicate with a single printer.

Connected to each of the terminal stations 1a, 1b ... 1n is a respective data utilising apparatus 100a, 100b, ... 100n (for example, a computer, a printer or a sensor)

The terminal stations 1 each communicate with their respective terminal apparatus 100 by electrical input and output ports 11, and each terminal station carries an optical input port for receiving an optical cable 3 and an optical output port for receiving an optical cable 3, (except that the last terminal station in, furthest from the head station 2, only reguires an optical input port)

Figure 2A:
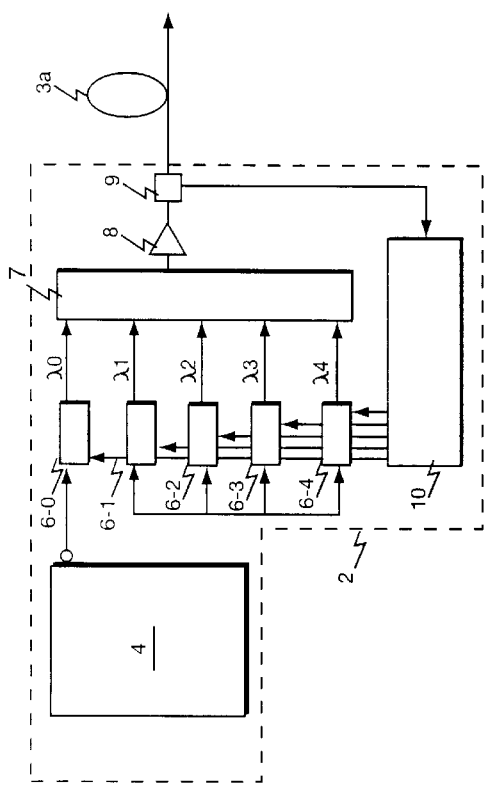
FIG. 2a is a block diagram showing schematically the elements of a head station according to the first embodiment.
Figure 3:
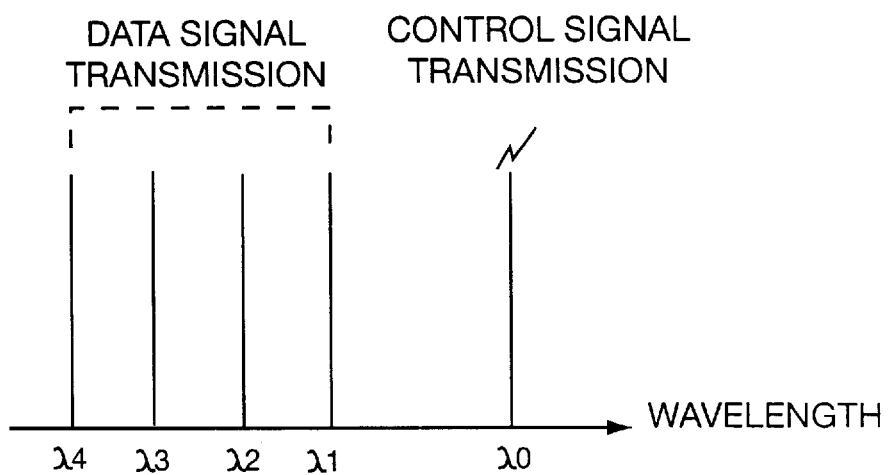
FIG. 3 is a diagram indicating the wavelengths used for transmission in the first embodiment.

Referring to FIG. 2a (in which only one terminal station 1 is shown for the sake of clarity), in this embodiment, the head station 2 comprises a plurality (e.g. five) laser diodes 6-0 to 6-4, each generating light at a corresponding frequency $\lambda_0$–$\lambda_4$ as indicated in FIG. 3. Each of the laser diodes 6 generates continuous wave (CW) light, and a control circuit 4 is provided to modulate the output of the laser diodes 6.

The wavelength $\lambda_0$ is used as a signalling wavelength for control signals, and the wavelengths $\lambda_0$–$\lambda_4$ are used as data transmission wavelengths.

The outputs of the laser diodes 6 are combined by a combining device 7, functioning as a wavelength multiplexer, which preferably comprises a grating device (e.g. a grating filter) receiving the light from the lasers at different incident angles, such that all the light leaves at a common diffraction angle, which light is launched into a light path containing an optical amplifier 8, for example an erbium doped fibre amplifier as described in Fourth Optoelectronics Conference OEC '92 (Japan) Invited paper 1733–1, Technical Digest pages 281–283, B. J. Ainslie; "Erbium doped fibre amplifiers". This amplifier 8 may be omitted if the output of the wavelength multiplexer 7 is reasonably high.

A portion of the combined optical signal is tapped by an optical coupler 9, and fed back to a wavelength stabiliser circuit 10 which stabilises the wavelength of the laser diodes 6 and may be, for example, as described in IEEE Journal of Wave Light Technology, Vol. 8, No. 3, pages 396–405, March 1990 S. Yamazaki et al; "A Coherent Optical FDM CATV Distribution System".

Figure 2B:
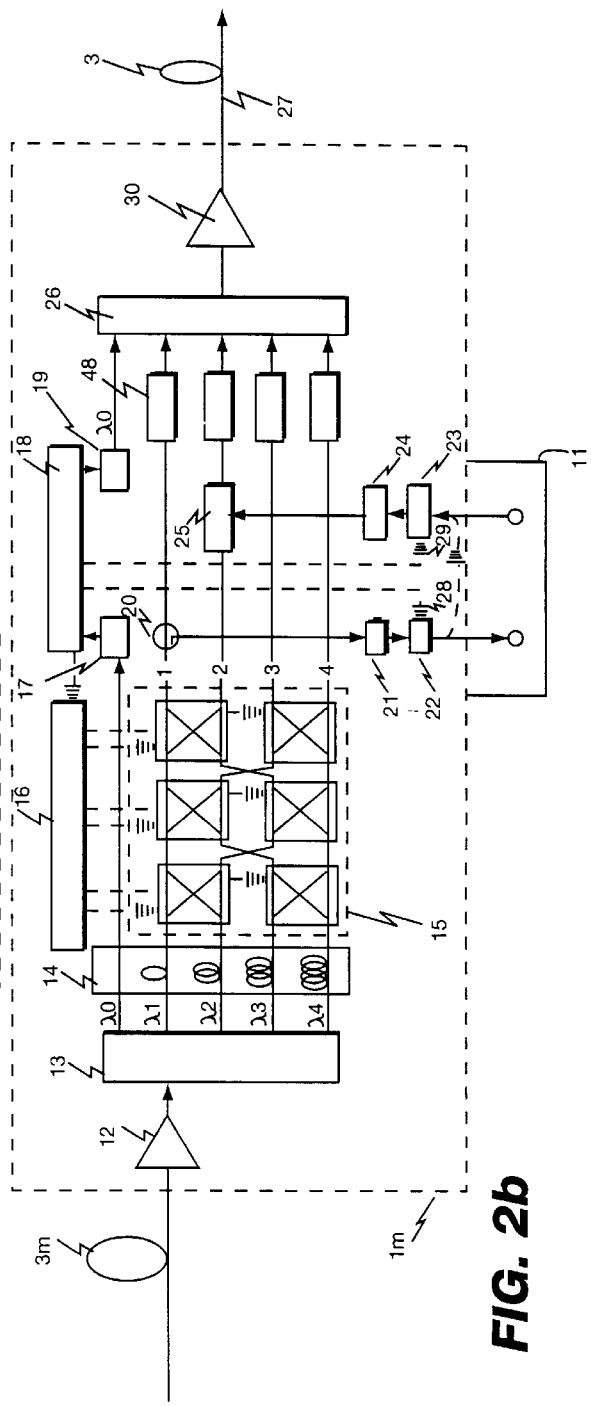
FIG. 2b is a block diagram showing schematically the elements of a terminal station according to the first embodiment.

After passing through the coupler 9, the combined light signal is injected into the optical fibre 3a, through which it arrives via other terminal stations 1 (not shown) and the optical fibre 3m, at the terminal station 1m illustrated in FIG. 2b.

After the fibre 3m is coupled to the optical input port (not shown) of the station 1m, the light beam is amplified, by an optical pre-amplifier 12 (e.g. an erbium doped fibre amplifier) to compensate for signal losses in the fibre 3m, and is wavelength demultiplexed (i.e. separated into spatially distinct beams of different wavelengths $\lambda_0$–$\lambda_4$) by a wavelength demultiplexer 13. The wavelength demultiplexer 13 is, for example, a grating device which may be identical to the wavelength multiplexer 7 of the head station 2, but in reverse configuration, so as to receive a signal beam, and split it into component wavelength beams.

As the optical fibre 3m will, in many cases, apply a chromatic dispersion to the light beam so as to delay different wavelengths by different amounts, there is provided a dispersion compensator 14 which consists, for each beam to different wavelength, of a length of optical fibre or other optical transmission medium. As the longest wavelengths are those most delayed by the chromatic dispersion of the fibre optic cable 3m, the lengths of fibre within the dispersion compensator 14 are inversely related to the wavelengths of the beams $\lambda_0$–$\lambda_4$.

For example, if the optical fibre optic 3m has a standard dispersion of 18 ps/nm/km and a length of 40 km, and if a wavelength spacing of 1 nm is used, a delay difference of 720 ps (equivalent to 44 mm of fibre) is necessary between adjacent wavelengths.

Thus, after each separated wavelength has passed through the respective length of fibre in the dispersion compensator 14, the signals at all the wavelengths $\lambda_0$–$\lambda_4$ are time aligned The signalling wavelength $\lambda_0$, generated by the laser 6-0 at the head station 2, is received at a photodiode (or other photosensor) receiver 17, where it is converted to an electrical signal which is supplied to a processor 18 (which may be a microprocessor or an ASIC).

The data transmission wavelengths $\lambda_0$–$\lambda_4$ are passed to a 4×4 non-blocking optical switch 15, so that any one of the four wavelengths at the input ports of the switch 15 can be switched to any one of the four output ports. The non-blocking optical switch 15 is a commercially available product described, for example, in IEEE proceedings—J, Vol. 139 No. 1, February 1993; J. E. Midwinter; "Photonics in Switching; the Next 25 Years of Optical Communications". The switch is controlled by a switch driver circuit 16 supplying electrical control signals to the switch 15 and the switch driver circuit 16 is controlled by the processor 18 in dependence upon data received from the receiver 17.

The processor 18 in this embodiment is connected to a laser diode 19 which emits light at the signalling wavelength $\lambda_0$.

On one of the output lines from the optical switch 15 is a coupler 20 (e.g. a fused fibre coupler) arranged to tap a small part (e.g. 10%) of the power of the signal on that line, which is supplied to a photodiode (or other optical) receiver 21, the electrical output signal of which is supplied, via a gating circuit 22, to an electrical output (drop) port connected to the terminal apparatus 100.

Connected to another of the output lines of the optical switch 15 is an optical modulator 25 (which can, for example, simply have the structure of a two port optical switch, only one input and one output of which are connected) for modulating the optical signal on that output port in accordance with an electrical signal supplied by an electrical driver circuit 24 supplying a serial bit stream in accordance with parallel data held in a memory 23 connected to an add (input) electrical port 11 of the terminal station 1m, for receiving signals from the terminal equipment 100.

The optical signal from the modulator 25 is combined with the signal from the transmitter 19, the signal from the coupler 20, and the signals from the other two ports of the switch 15, after passing through a bank of attenuators 48 arranged to compensate for the drop in power caused by the modulation and tapping, so that all the combined wavelengths $\lambda_0$–$\lambda_4$ have equal power levels. The data transmission wavelengths and the signalling wavelength are then recombined by a combiner 26 (which may be an optical coupler) and the combined optical signal is amplified by an optical amplifier 30 (e.g. an erbium doped fibre amplifier) to take account of the losses of the attenuator bank 48, switch 15 and other components.

in this embodiment, one of the wavelengths is routed through the coupler 20 whether or not it contains data to be received. The processor 18 controls the gate circuit 22 to block the received data from the receiver 21 except where data is being received.

The operation of this embodiment will now be explained in greater detail.

Figures 4A, 4B:
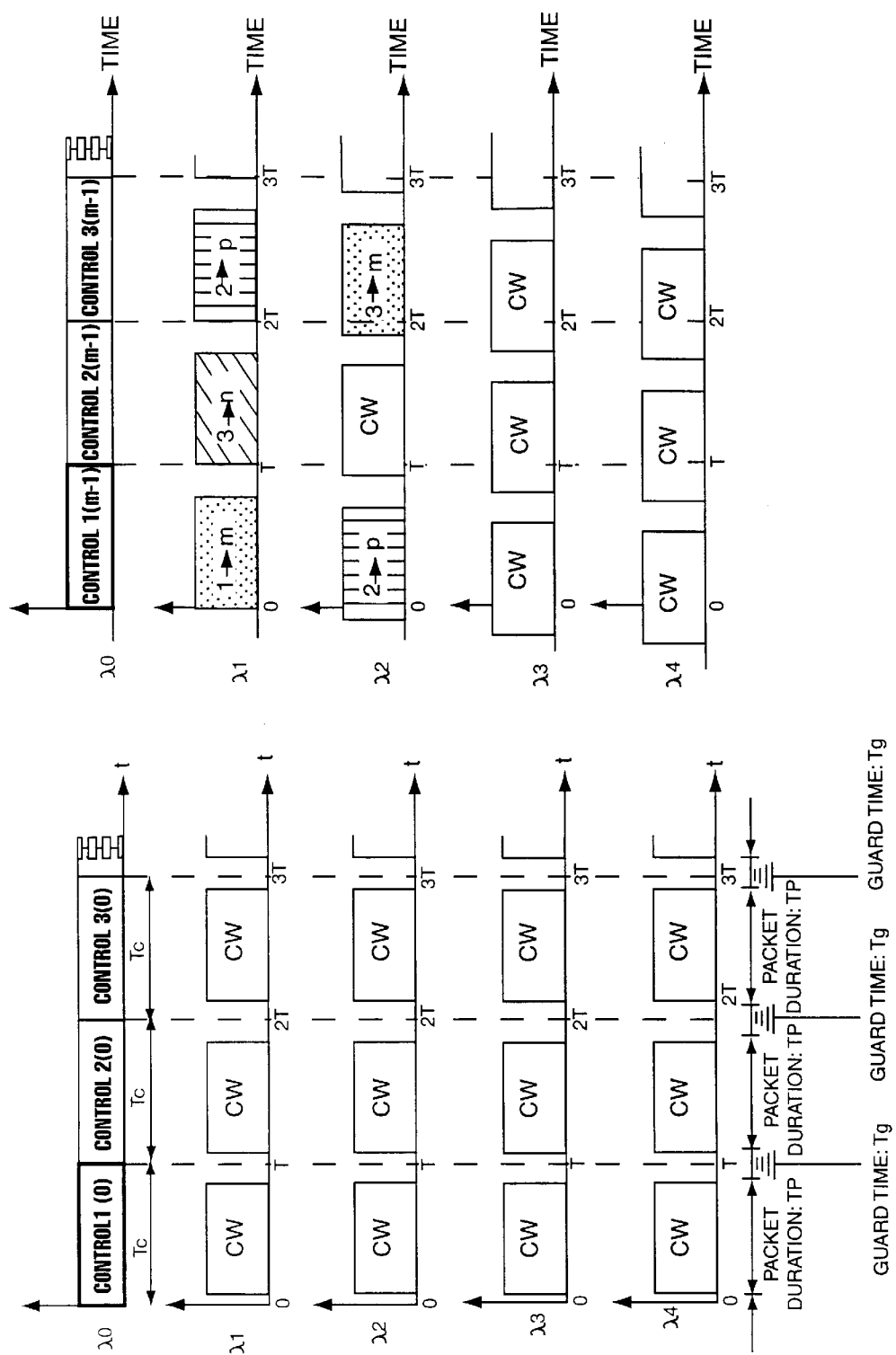
FIGS. 4a–4f are diagrams showing the contents of each of the wavelengths of FIG. 3 over time, at progressive stages through the system of the first embodiment.

Referring to FIG. 2a, the control circuit 4 at the head station 2 generates regular pulses of duration $T_p$ separated by a guard time $T_g$ so that the pulse repetition interval is $T=T_p+T_g$. The pulses are applied to switch on and off the outputs of the data transmission wavelength laser diodes 6-1 to 6-4 (e.g. through modulators, not shown) so as to produce a slotted continuous wave signal from each as indicated in FIG. 4a. The control circuit 4 also generates a digital code which modulates the signalling wavelength laser diode 60, the code indicating that all wavelengths are free for signalling. In this embodiment, this simple digital code is generated on all occasions except where, for example, one of the laser diodes 6-1 to 6-4 is damaged; in which case, the code indicating the identities of the wavelengths which are available for signalling is transmitted instead.

The transmitted code relates to the availability of wavelengths in subsequent time slots; typically, the next time slot but possibly the next but one or next but two time slots (to allow the terminal stations 1a–1c more time to configure themselves)

Referring to FIG. 4b, when the optical signal arrives at the fourth terminal station 1m, the three preceding stations have already commenced sending data. In the first time slot ($0 \leq \text{time} \leq T$), the first station (1a) has transmitted a data signal to the mth station 1m of FIG. 2b (in a manner which will be discussed in greater detail below) on wavelength $\lambda_1$ and the second station (1b) has transmitted a data signal to the pth station (1p) on wavelength $\lambda_2$. In the second time slot, ($T \leq \text{time} \leq 2T$), the third station has transmitted a message to the nth station on wavelength $\lambda_1$. In the third time slot, ($2T \leq \text{time} \leq 3T$), the second terminal station (1b) has transmitted a further data signal to the pth terminal station on wavelength $\lambda_1$ and the third terminal station (1c) has transmitted a message to the mth terminal station on wavelength $\lambda_2$.

It will be seen that, due to the chromatic dispersion of the fibre 3m to which the terminal station 1m in FIG. 2b is connected, the time slots in the different wavelengths have become misaligned.

Figures 4C, 4D:
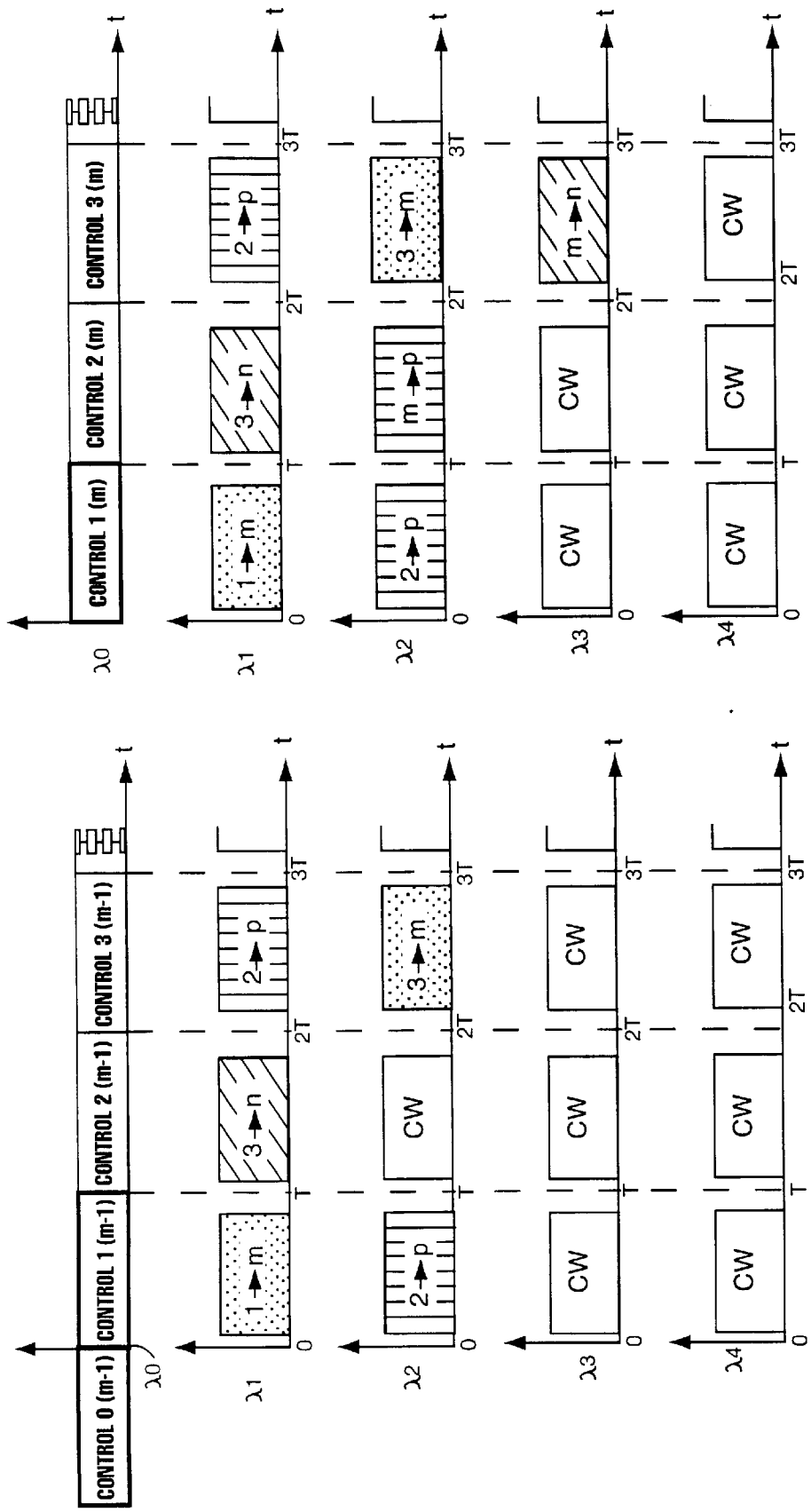

Referring to FIG. 4c, after passing through the dispersion compensator 14, the time slots are shown to be substantially realigned.

At this time, the terminal station 1m of FIG. 2b has in its memory a packet of data to be sent to terminal station 1p and a packet of data to be sent to the terminal station 1n, both stored in the memory 23, having previously been received from the terminal equipment 100.

The receiver 17 in the terminal station 1 reads the digital signal carried by the signalling wavelength $\lambda_0$ in the Lime period between $t=-T$ and $t=0$, labelled control 0 (m-1) in FIG. 4c. This contains four digital words; one for each of the transmission wavelengths $\lambda_0-\lambda_4$ in the next time slot. The first word comprises an indication of the mth terminal station (for example a five bit signal) and a corresponding indication of the destination terminal station for the first wavelength $\lambda_0$, and in this case indicates that the first terminal station (1a) is transmitting a message to this station 1m. Similarly the second word indicates that the second station is transmitting a message to the pth station on $\lambda_2$. The third and fourth words indicate that $\lambda_3$ and $\lambda_4$ are free for message transmission in the time slot extending between $t=0$ and $t=T$.

The processor 18 receives the electronic digital data generated by the receiver 17, and extracts from it timing signals for synchronising the readout from the memory 23 and read-in to the gate 22. The processor 18 studies the destination parts of each word, and matches these against its own stored terminal station number m. In this instance, a match is found in the word relating to the first wavelength $\lambda_1$. Accordingly, the processor 18 controls the switch driver 16 to set the switch 15 to route the wavelength $\lambda_1$ from its input port at the switch 15 through to the first output port of the switch 15, at which is located the coupler 20. Then, in the following time slot from $t=0$ to $t=T$, the processor 18 generates a gating signal 28 lasting the duration of a time slot to switch the electrical output signal of the receiver 21 to the electrical output port connected to the terminal equipment 100, so as to drop the data packet on the wavelength $\lambda_1$.

At the same time, the processor 18 has an indication that data is awaiting transmission in the memory 23. Accordingly, the processor 18 notes the occurrence of the first word indicating a free wavelength, in this case $\lambda_3$ in the following time slot between $t=0$ and $t=T$.

However, since the packet to be transmitted in the memory 23 is destined for terminal station 1p and since the processor 18 has decoded the signalling wavelength $\lambda_0$ and decoded an indication that wavelength $\lambda_2$ already contains a data packet transmitted on the free wavelength in the next time slot, the terminal station 1p would receive two messages simultaneously and only be able to decode one in this embodiment.

Accordingly, to avoid this collision at the destination terminal station 1p the processor 18 does not transmit on any of the free wavelengths in the next time slot.

The processor 18 then controls the transmitter 19 to re-transmit the received header data, in exactly the same form, on the signalling wavelength $\lambda_0$ in the timeslot between $t=-T$ and $t=0$.

Since the total volume of information signalled on the signalling wavelength $\lambda_0$ is relatively low compared to that on the data transmission wavelengths, the incoming data will be received during a relatively early portion of the time slot between $t=0$ and $t=T$.

Because the processor 18 takes a finite processing time ($T_R$) to read and regenerate the signalling data (although the time may in fact be quite short, since the volume of data is low), it cannot write the data to exactly the right time position in the time slot. Accordingly, in this embodiment, a delay (5-1 to 5-4) of length equal to $T_R$ is positioned in the path of each data wavelength to bring them into time alignment with the ($T_R$ delayed) signalling wavelength $\lambda_0$. The delays (5-1 to 5-4) may be lengths of fibre, and could alternatively conveniently be provided combined with the dispersion compensator 14.

During the next time slot between $t=0$ and $t=T$, whilst the incoming data on $\lambda_1$ is being dropped, the processor 18 reads the signalling channel $\lambda_0$ and detects a free wavelength $\lambda_2$ in the following time slot from $t=T$ to $t=2T$. Moreover in this time slot there is no conflicting message to terminal station 1p. Accordingly, as the processor 18 will transmit data on this wavelength, it must re-write the word on the signalling wavelength $\lambda_0$, The processor 18 controls the laser diode 19 to generate the control signal indicating that wavelength $\lambda_1$ is occupied with a message from terminal station 3 to terminal station n; this portion of the message transmitted by the diode 19 is identical to that received by the receiver 17. However, the processor 18 also adds a message that the wavelength $\lambda_2$ will contain a message from this terminal station 1m to terminal station 1p, and that only the wavelengths $\lambda_3$ or $\lambda_4$ are now free.

Referring now to FIG. 4d, during the time slot from $t=T$ to $t=2T$, the processor 18 controls the switch 15 to route the selected wavelength $\lambda_2$ from its input port of the switch 15 to the second output port of the switch 15 at which is located the modulator 25. The continuous wave signal input to the modulator 25 is then modulated in accordance with data packet stored in, and supplied from, the memory 23 which data packet is read out as a serial bit stream under control of the processor 18 through the driver circuit 24. Thus, as shown in FIG. 4d, during the second time slot, the wavelength $\lambda_2$ is occupied by this transmitted data packet. The modulated wavelength is recombined with all the others through the combiner 26 for retransmission.

Whilst the data packet is being transmitted, in the time slot from $t=T$ to $2T$ the receiver 17 decodes the control signal (control 2(m)) during the same time interval and notes that wavelength $\lambda_3$ is free in the following time slot from $t=2T$ to $t=3T$, and that there is an incoming packet for that terminal station on wavelength $\lambda_2$.

Accordingly, the processor 18 transmits, via the laser diode 19, an amended signal on the signalling wavelength $\lambda_0$ indicating (in addition to the previous data received by the processor 18), that a packet from station 1m to station 1n will be transmitted on $\lambda_3$ in the next time slot and that this wavelength is thus not free.

In the next time slot between 2T and 3T, the processor 18 controls the switch driver 16 to route wavelength $\lambda_2$ to the coupler 20, so that the packet on that wavelength can be dropped and routes the continuous wave modulated signal on wavelength $\lambda_3$ through to the modulator 25, which modulates onto the wavelength the data packet for station n, the combiner 26 for transmission to the next station.

In this embodiment, as well as sending single packets of data from one terminal station to another, it is possible to broadcast data from one terminal station to all terminal stations further down the fibre (or from the head station 2 to all terminal stations 1)

Figures 4E, 4F:
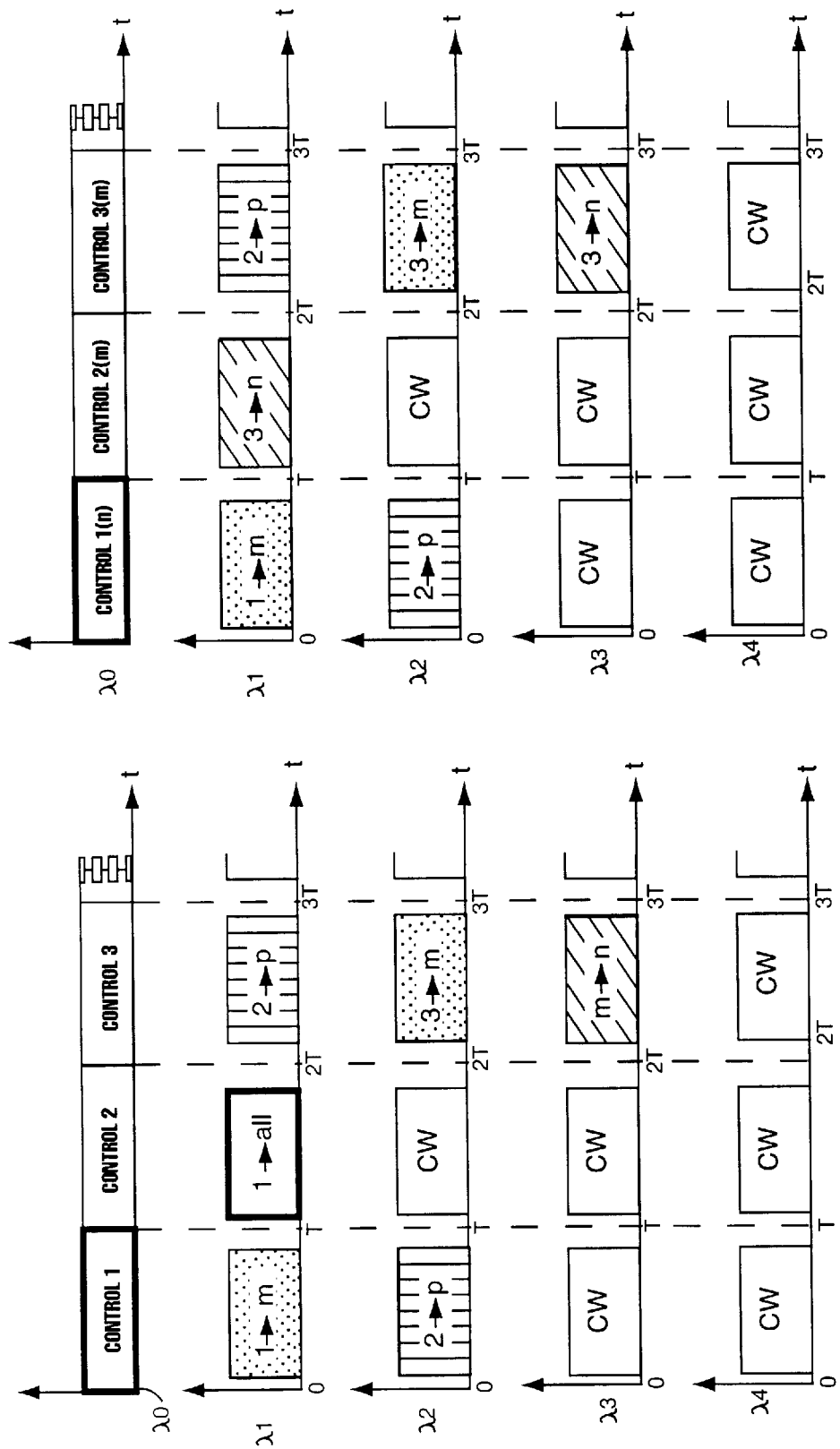

Referring to FIG. 4e, in this case, the control word on the signalling wavelength $\lambda_0$ in time t=0 to t=T indicates that in the following time slot, a message from the first station (1a) to all stations is being transmitted. Accordingly, the processor 18 of each station will control the switch 15 to route wavelength $\lambda_1$ to the coupler 20, to drop the wavelength at each station.

Further, if (as shown in FIG. 2b) a selectable feedback path is provided from the gate 22 to the memory 23, wavelength translation may be performed at each terminal station by receiving a data packet, routing the packet from the gate 22 to the memory 23, and retransmitting the packet in a subsequent time slot. This may be useful where, for example, a failure of the switch 15 makes it impossible to connect one of the wavelengths (for example $\lambda_1$) to the coupler 20, so that packets on the wavelength $\lambda_1$ cannot be received at that terminal station. Accordingly, a preceding terminal station may perform wavelength translation to move the packet to one of the other wavelengths.

The effect of this is illustratively indicated in FIG. 4f in which a data packet in the time slot T-2T from the third terminal station to the nth terminal station has been received on wavelength $\lambda_1$ and retransmitted on wavelength $\lambda_3$ in the following time slot. Such wavelength translation may, for example, be instructed by a control signal on the signalling wavelength $\lambda_0$ from the head station 2, or another terminal station 1, or may be preprogrammed into the processor 18.

Variations to the First Embodiment

Various modifications or substitutions can be made in the structure and function of the first embodiment. For instance, the wavelength multiplexers and demultiplexers, instead of being grating interferometer devices, may be Mach-Zender devices, dielectric multiple thin film filters, or even optical couplers. The optical amplifier 8 may, instead of being a fibre amplifier, could be a semiconductor optical amplifier. Optical amplifiers in the head station 2 and terminal stations 1 may be omitted if the losses in the wavelength multiplexers and fibres 3 are sufficiently low, or if the fibres 3 are of the self amplifying type (e.g. erbium doped fibres), or if separate repeater stations are provided to amplify the signals.

The laser diodes 6 may be substituted by light emitting diodes, gas lasers, fibre lasers or other suitable light source.

Naturally, other numbers of wavelengths are possible; FIG. 5 illustrates the generalised structure of the first embodiment for k wavelengths.

The guard time $T_g$ is provided to allow for switching of the optical devices (e.g. switch 15) in the terminal stations 1, but it is possible to omit the guard time and provide continuous wave light, if no data transmission is actually performed during the switching time.

The signalling wavelength $\lambda_0$ can furthermore be used to carry other signalling and control information concerning the operation, administration and maintenance of the network, or even low bit rate communication between terminal stations. Data may be transmitted on the signalling wavelength in the synchronous digital hierarchy (SDH) format, as described in "Transmission Networking: SONET and Synchronous Digital Hierarchy"; M. Sexton & A. Reid, 1992 published by Artech House, USA, ISBN 0-89006-551-9.

Accordingly each processor 18 of each terminal station may write status information concerning its operation (e.g. including any component failures) to the signalling channel.

The optical modulator 25 may for example be an electro-absorption modulator, or a Mach-Zender modulator, and may use amplitude modulation, or frequency modulation, phase modulation or some other modulation system.

The dispersion compensation unit 14 may, rather than comprising an array of fibre optic cables of different length, comprise a single dispersion compensation fibre (i.e. a fibre having the reverse chromatic dispersion behaviour to ordinary fibre), as described in Proceedings of the Nineteenth European Conference on Optical Communications (ECOC'93) Sep. 12–16 1993, Vol. 2, paper WeC8.3, pages 349–352, A. Belov et al; "The Realisation of Broadband Dispersion Compensation using the Multicladding Waveguide Structure", or in the same Conference Proceedings at paper WeC8.5 at pages 357–360, M. Onishi et al; "High Performance Dispersion—Compensating Fibre and its application to Upgrading of 1.31 $\mu$m optimised system".

In this case, the dispersion compensator 14 would be positioned before the wavelength demultiplexer 13. Alternative devices such as optical rings, Fabry Perot resonators, or compensators using optical phase conjugation techniques could also be employed. Rather than employing a parallel bank of delays, different wavelengths could be separated out one at a time and a ladder structure of differential delays in series could be employed between separation points.

The dispersion compensator 14 might be omitted under exceptional circumstances, where the cable 3 comprises very short lengths of fibre; or where the chromatic dispersion of the fibre 3 is low. It would also, of course, be possible to position the dispersion compensator 14 between terminal stations, rather than at terminal stations, or to position it at the output side of the head station 2 and terminal stations 1, so as to pre-distort the multiplexed signal such that the dispersion of the fibre 3 will result in an undistorted signal arriving at the terminal stations 1.

The wavelength stabiliser 10 of the head station 2 may be omitted if a sufficiently large wavelength spacing between adjacent wavelengths (for example more than 1 nm) can be provided. In this case, rough temperature stabilisation For each light source 6 is sufficient to avoid crosstalk. Of course, such an arrangement makes less efficient use of the bandwidth of the fibre.

It would be possible to omit some or all of the optical attenuators 48, the optical power difference between different wavelengths is sufficiently small, and the phrase "attenuator" will also be understood to encompass an optical amplifier having a gain of greater than unity in some or all of the wavelength paths.

Although FIG. 2b shows a 4×4 non-blocking optical switch which is realised as a 2×3 array of 2×2 non-blocking optical switch elements, it will be apparent that other configurations for non-blocking optical switches could equally be employed.

This embodiment may operate in the 1.55 $\mu$m wavelength domain, at 155 Mbit/s or 2.5 Gbit/s per wavelength data rates, for example.

In summary, the first embodiment shows an arrangement in which each terminal station 1 has a coupler device for tapping and receiving data from a selected wavelength and a modulator device for modulating data onto a selected wavelength, and the data transmission wavelengths are spatially separated and selectively switched to the coupler or the modulator by a (non-blocking) optical switch. The signalling wavelength is received, and the contents thereof are retransmitted by a light source in the terminal station 1.

Second Embodiment

Figure 6:
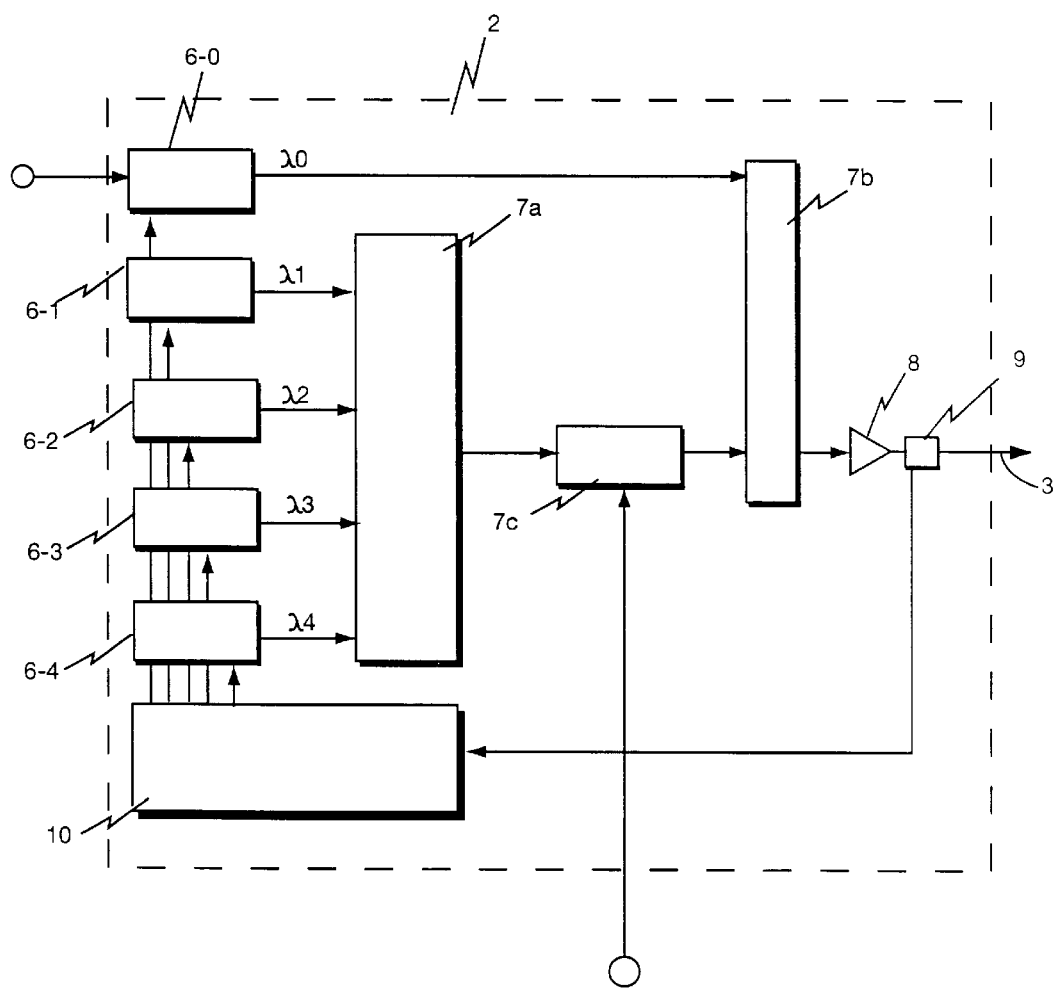
FIG. 6 is a block diagram showing schematically the construction of a head station of a second embodiment of the invention.

Referring to FIG. 6 (which corresponds to FIG. 2a in the first embodiment) in the second embodiment, all details are the same as in the first embodiment described above and will not be repeated here, except that in the head station 2, instead of providing a single wavelength multiplexer 7, there are provided a first wavelength multiplexer 7a, which combines the data transmission wavelengths $\lambda_1$–$\lambda_4$ from the light sources 6-1 to 6-4 to provide a single combined light beam, and a second wavelength multiplexer 7b which combines this data transmission light beam with the signalling beam $\lambda_0$ from the light source 6-0 to produce the same output as the wavelength multiplexer 7 in the preceding embodiment. Rather than modulating the output of each laser diode 6-1 to 6-4 separately, the control circuit 4 in this embodiment can supply a single modulation pulse train to operate a modulator device 7c located in the combined data signalling beam between the output of the wavelength multiplexer 7a and the input of the wavelength multiplexer 7b so as to modulate all data transmission wavelengths simultaneously. As in the earlier embodiment, the modulator 7c may be for example an electro-absorption modulator or a Mach-Zender modulator. Since only one modulator is necessary, the head station structure may be simpler than in the first embodiment.

Third Embodiment

Figure 7:
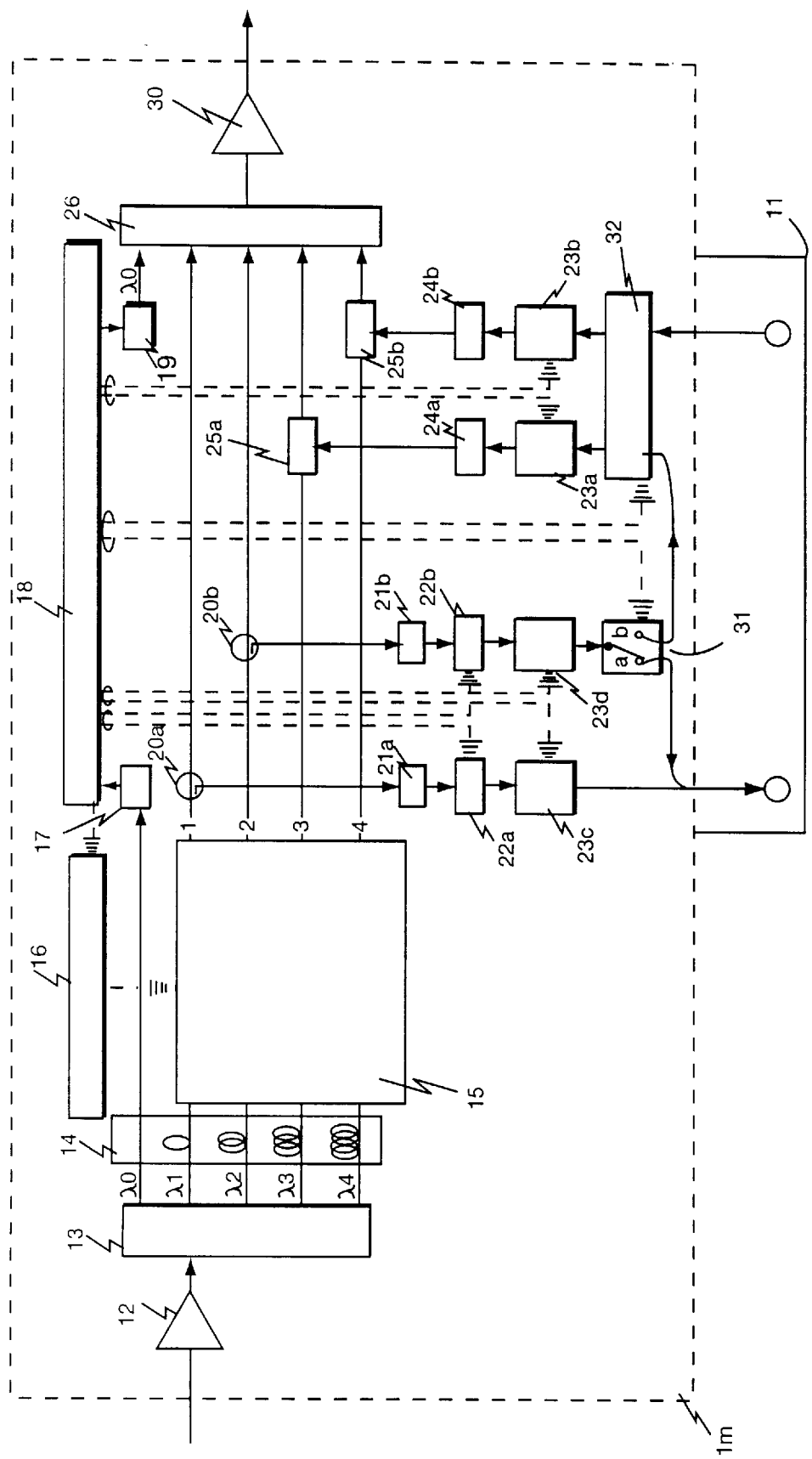
FIG. 7 is a block diagram showing schematically the structure of a terminal station of a third embodiment of the invention.

Referring to FIG. 7, in the third embodiment, all details of the system are the same as in the first or the second embodiments except as discussed below.

In this embodiment, two drop paths for dropping data from two wavelengths simultaneously are provided, and two add paths for adding data to two wavelengths simultaneously are provided in a terminal station 1.

Each of the add paths comprises a packet (buffer) memory 23a (23b), a driver circuit 24a (24b) and a modulator 25a (25b). The two modulators 25a, 25b are connected to different output ports of the switch 15.

Likewise, each of the two drop paths comprises a receiver 21a (21b) and a gating circuit 22a (22b). Additionally, in this embodiment, packet memories 23c, 23d are provided in each drop path to retain the incoming packets, so that one packet can be retained while the other is output to the terminal equipment 100.

Furthermore, in this embodiment, an electrical switch 31 is provided for selectively routing the output of one of the memories 23d either to the terminal equipment 100, or on the wavelength translation path to the add paths. Also provided in this embodiment is a 2×2 electrical switch 32 receiving at its input ports one output of the switch 31 and one output signal from the terminal equipment 100, and routing these to a selected one of the memories 23a, 23b. The switches 31, 32 are set under control of the Processor 18.

Other details of this embodiment are as disclosed in relation to FIG. 2b.

Thus, the processor 18 can selectively route any two of the data transmission wavelengths $\lambda_1$–$\lambda_4$ to the two modulators 25a, 25b and thus two data jackets can simultaneously be transmitted. The processor in this case is arranged to write corresponding information to the signalling wavelength indicating that two packages are transmitted.

Likewise, the processor 18 can route two incoming wavelengths containing data packets to the two couplers 20a, 20b for simultaneous reception of two data packets. The memories 23a, 23b and the switch 31 are arranged so that memories 23c, 23d are coupled in sequence to the electrical output port connected to the terminal equipment 100.

Thus, the data transmission rate in this embodiment can be higher. Since each terminal station 1 can receive two packets simultaneously, unlike the first embodiment, if the processor 18 detects a packet is already being transmitted to a terminal station 1p and the processor itself has a packet to be transmitted to that station, it can proceed to do so without fear of collision. However, if the signalling wavelength data indicates that two packets are already being simultaneously transmitted to that station 1p on different wavelengths, the processor 18 in this embodiment will not cause a further packet to be sent to that station so as to avoid overloading the station with three packets.

It will be apparent that other numbers of add and drop paths, functionally identical to those shown in FIG. 7 can be employed, up to the number of data transmission wavelengths employed (in this case four). For example, four add and two drop paths may be provided, or three drop and two add paths.

Thus, in this embodiment, several add and/or drop paths are provided in parallel to permit simultaneous adding and/or dropping a plurality of wavelengths, and wavelengths are selectively routed to the add and/or drop paths by an optical spatial switch.

Fourth Embodiment

Figure 8:
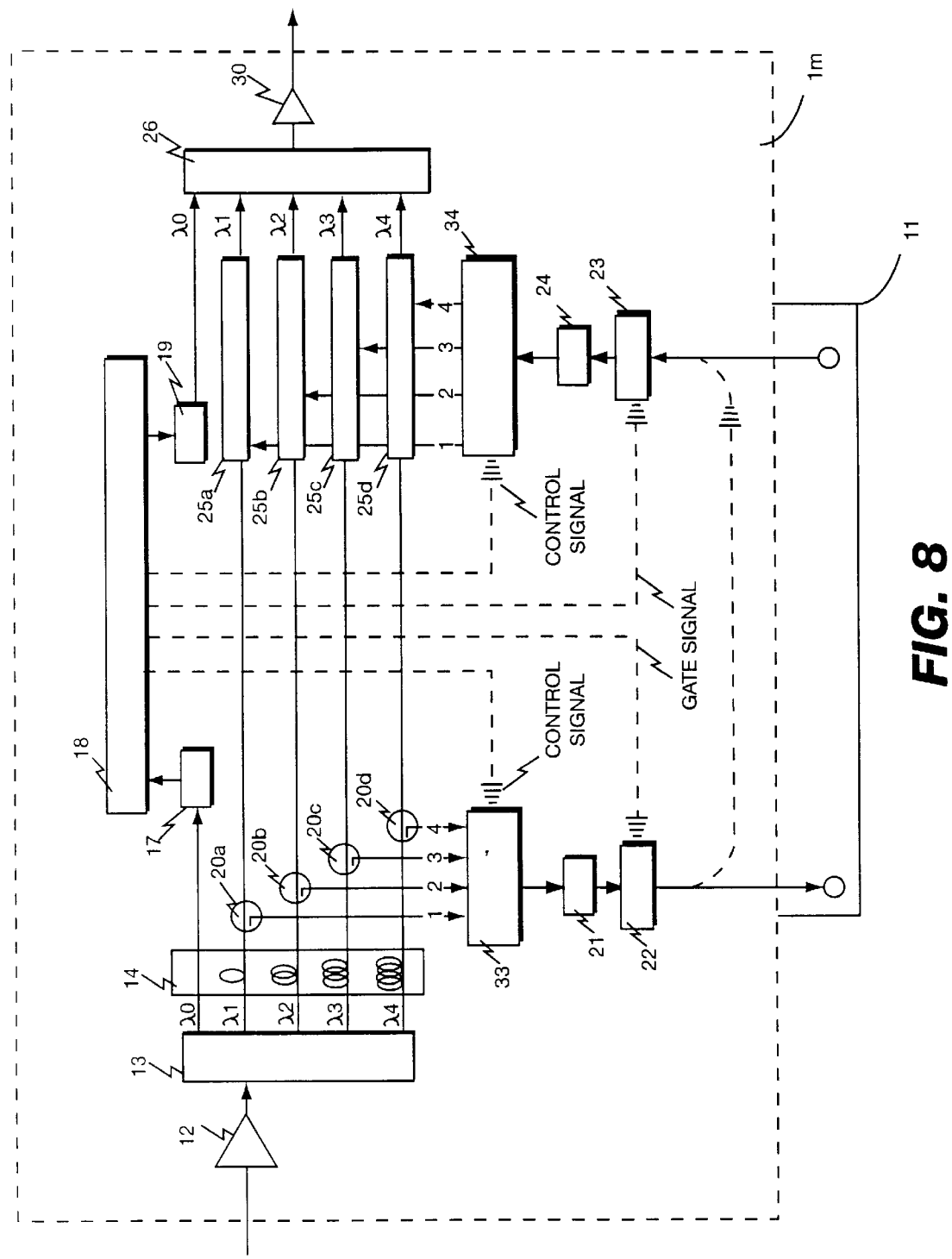
FIG. 8 is a block diagram showing schematically the structure of a terminal station of a fourth embodiment of the invention.

Referring to FIG. 8, in this embodiment, all components are the same as in the preceding embodiments except where otherwise indicated below.

In this embodiment, the optical switch 15 is omitted, and there is a direct optical path between the wavelength demultiplexer 13 and the combiner 26 for each of the data transmission wavelengths $\lambda_1$–$\lambda_4$. In each of the paths is a respective coupler 20a–20d and a respective modulator 25a–25d. The four outputs of the four couplers 20a–20d are received at respective input ports of a 4×1 optical switch 33, which (under control of the Processor 18) selectively routes one of the outputs (i.e. one of the data transmission wavelengths) to the receiver 21 and gate 22, which operate as in the first embodiment.

Likewise, the four control inputs of the modulators 25a–25d are connected to respective output ports of a 1×4 electric switch (selector) 34, which selectively connects the control signal from the driver 24 and memory 23 to one of the modulators 25a–25d (and hence one of the data transmission wavelengths $\lambda_1$–$\lambda_4$) under control of the processor 18.

Thus, when the processor is aware that a data packet for the terminal station is arriving on a wavelength (say $\lambda_3$) the processor 18 controls the switch 33 to connect the output of the coupler 20c through to the receiver 21 to receive the packet.

Likewise, when the processor has located a free wavelength (say $\lambda_4$) on which to transmit ("add") a packet held in the memory 23, the processor controls the switch 34 to route a signal from the driver 24 to the modulator 25d. In each case, the other modulators 25 are set to an inactive condition, in which they provide a straight-through path for the wavelengths concerned.

Various changes could be made to this embodiment. For instance, the optical switch 33 could be omitted and the single receiver 21 could be replaced by four receivers 21a–21d, one in each of the output lines of the couplers 20a–20d In this case, a 4×1 electrical switch would be provided for selectively routing the output of one of the receivers 21a–21d to the gate 22.

If the optical switch 33 has a null state in which none of the inputs thereto is connected to the output, then the gate circuit 22 can be omitted, as setting the optical switch 33 to the null state will effectively gate the signal therethrough.

In this embodiment, the combiner 26 is preferably a wavelength multiplexer (e.g. of the diffraction grating type, or any of the other types mentioned above) since this structure has a lower insertion loss than a conventional coupler. This is possible because, in this embodiment, the oath followed by each wavelength is predetermined and does not vary over time.

It will be apparent that, although in FIG. 8 only a single drop oath and a single add path are shown, the arrangement could be expanded in a similar manner to that discussed with reference to FIG. 7 to allow for simultaneous add and drop of packets. For example, the switches 33 and 34 could be omitted and separate receivers 21a–21d and gates 22a–22d could be provided in each output path of each coupler 20a–20d, connected to respective temporary buffer memories as in FIG. 7 to retain received packets, and likewise four separate driver circuits 24 and packet transmission memories 23 could be provided in the respective input paths to the four modulators 25a–25d, the processor 18 selectively operating up to four of the couplers and modulators simultaneously.

The modulators in this embodiment may, for example, be Lithium Niobate modulators as disclosed in the above referenced Midwinter paper.

In summary, in this embodiment, a modulator and a coupler are provided in each of the demultiplexed data transmission wavelength paths and consequently the optical switch 15 may be omitted (together with the switch driver circuit 16) Accordingly, the insertion loss associated with the optical switch 15 is omitted, and the overall loss in the terminal 1 in this embodiment is therefore lower. Furthermore, the control circuitry for controlling the switches 33 and 34 can be made somewhat simpler than the switch driver circuit 16 required for the optical switch 15.

Fifth Embodiment

Figure 9:
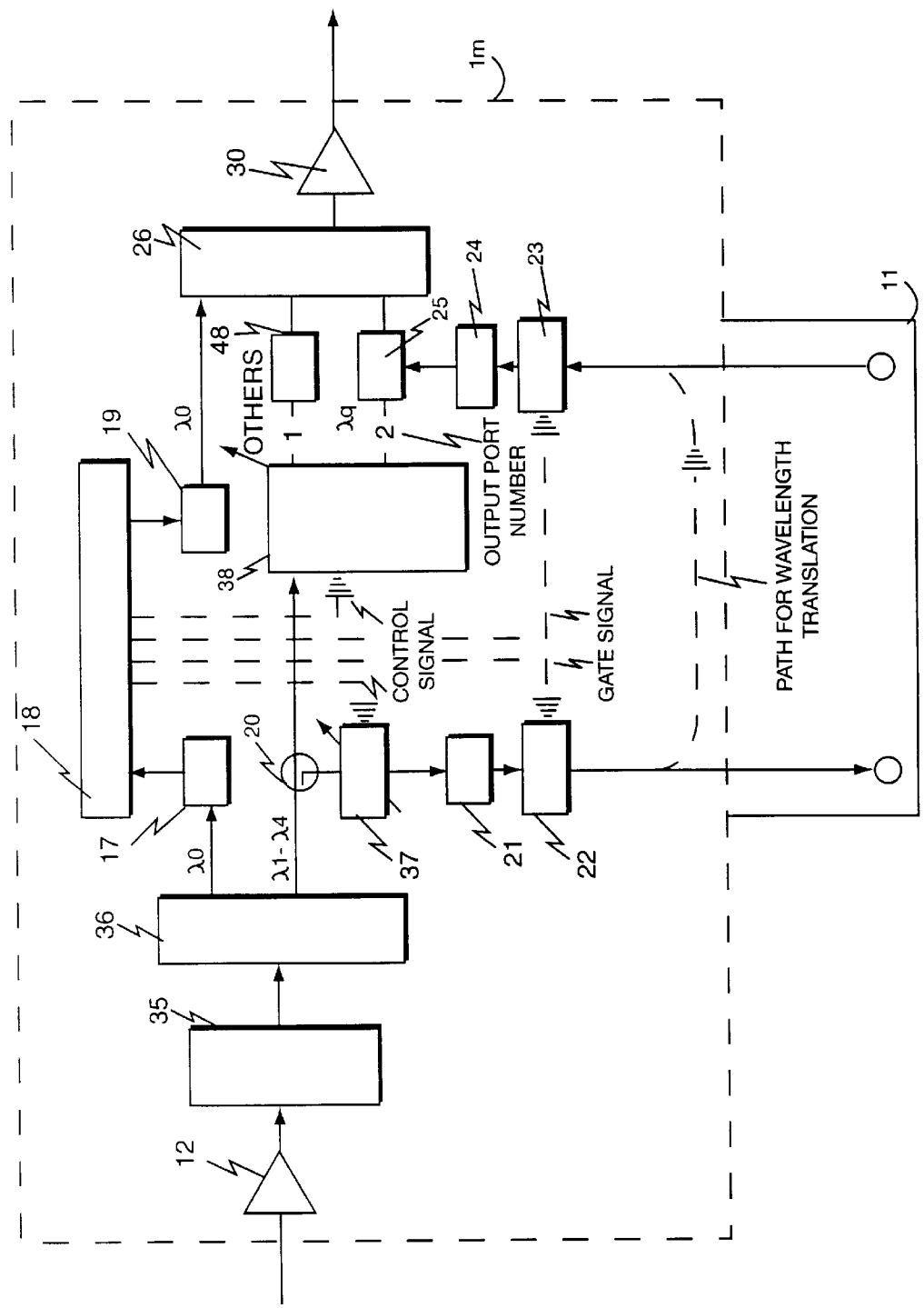
FIG. 9 is a block diagram showing schematically the structure of a terminal station according to a fifth embodiment of the invention.

Referring to FIG. 9, in the fifth embodiment, in the terminal station 1 shown in FIG. 9 the optical data transmission wavelengths $\lambda_1$–$\lambda_4$ are not demultiplexed and spatially separated as in the earlier embodiments. Instead, optical tunable filter devices are employed to selectively tune to the desired wavelength for dropping or adding data packets. Other details of this embodiment are as described in the earlier embodiments unless otherwise indicated below.

Accordingly, in this embodiment, the received optical signal is dispersion equalised by a dispersion compensator 35 (which is preferably a single length of dispersion compensation fibre as discussed in the above disclosed Belov and Onishi papers). The dispersion compensated, wavelength multiplexed optical signal is then fed to a wavelength demultiplexer 36 which merely separates the signalling wavelength $\lambda_0$ on to one spatial path and leaves all four data transmission wavelengths $\lambda_1$ –$\lambda_4$ on a second path. A coupler 20, the output of which is connected to a receiver 21 and gate circuit 22 as in the first embodiments, is located in the combined data transmission wavelength path.

Interposed between the coupler 20 and the receiver 21 is a tuneable bandpass filter 37, for example an acoustically tuneable optical filter as described in Applied Physics Letters Vol. 56 (3), 15 Jan. 1990, D. A. Smith et al; "Polarisation—Independent Acoustically Tuneable Optical Filter", or in IEEE Photonics Technology Letters Volume 1 (2) pages 38–40, February 1989, K. Cheung et al; "Electronic Wavelength Tuning Unit Acousto-Optic Tuneable Filter with Broad Continuous Tuning Range and Narrow Channel Spacing", (referenced in the above mentioned Chlamtac paper). The tuneable bandpass filter 37 is controlled by the processor 18 to pass only one of the wavelengths $\lambda_1$–$\lambda_4$, which has been detected by the processor 18 to be free on the basis of data on the signalling channel $\lambda_0$.

The optical path followed by the combined wavelengths $\lambda_1$–$\lambda_4$ also passes to a further tuneable bandpass filter 38 (which may be of the same type as the filter 37) The tuneable optical filter 38 splits the combined optical signal into a bandpass output which is fed to a modulator 25 (as in the preceding embodiments), and a band reject output which is fed to an attenuator 48 having the same attenuation characteristic as the modulator 25. The outputs of the attenuator 48 and modulator 25 are then recombined, together with the signalling wavelength output $\lambda_0$ of the transmitter 19, in a combiner 26 (e.g. a coupler) and output via an amplifier 30.

Thus, when data packet is to be added in this embodiment, the processor 18 controls the filter 38 to select its passband to correspond to the desired wavelength (for example $\lambda_4$) which is accordingly modulated by the modulator 25, all other wavelengths passing through the reject output of the filter 38 and being recombined with the modulated wavelength in the combiner 26.

It will be apparent that variations may be made to the structure of this embodiment. For example, the tuneable bandpass filter 37 could be replaced with a wavelength demultiplexer receiving the output of the coupler 20 and providing for wavelength demultiplexed light paths one containing each of the transmission wavelengths, which can then either be routed to a single receiver 21 using a 4×1 optical switch as in the preceding embodiment, or fed to four respective receivers 21a–21d the output of one of which is selected by a 4×1 electrical switch as in the above embodiment, or the outputs of the four receivers 21a–21d could be provided to separate memories to allow up to four data packets on different wavelengths to be simultaneously dropped. This arrangement could be used also in the above embodiments.

The gate 22 can be omitted if the bandpass filter 37 is controlled by the processor 18 to switch to a wavelength other than $\lambda_1$–$\lambda_4$, thus effectively blocking the transmission of all data therethrough.

The tuneable optical filters 37 and 38 could instead be grazing filters, dielectric thin film filters, fibre Fabry-Perot filters, or filters of the type disclosed in EP 0452895.

Multiple filters 38 could be provided to allow more than one data packet to be added simultaneously.

As in the above embodiments, it may be possible to dispense with the optical amplifiers 12, 30, the dispersion equaliser 35, and the attenuator 48, or to provide instead of the attenuator 48 an optical amplifier in the path of the modulator 25.

In other respects, this embodiment may involve features of the above described embodiments.

In summary, in this embodiment, a tuneable bandpass filter is used in the add path and/or the drop path, of the terminal station 1 to separate out the desired wavelength. This embodiment offers greater flexibility than the above described embodiments, because the bandpass filters 37, 38 can have continuously variable or controllable characteristics and so the terminal station 1 can be utilised without changing hardware when the data transmission wavelengths are changed or added to, merely by changing the control signals supplied by the processor 18 to the filters 37, 38. Thus, this embodiment offers the potential for greater flexibility than the above described embodiments.

Sixth Embodiment

Figure 10:
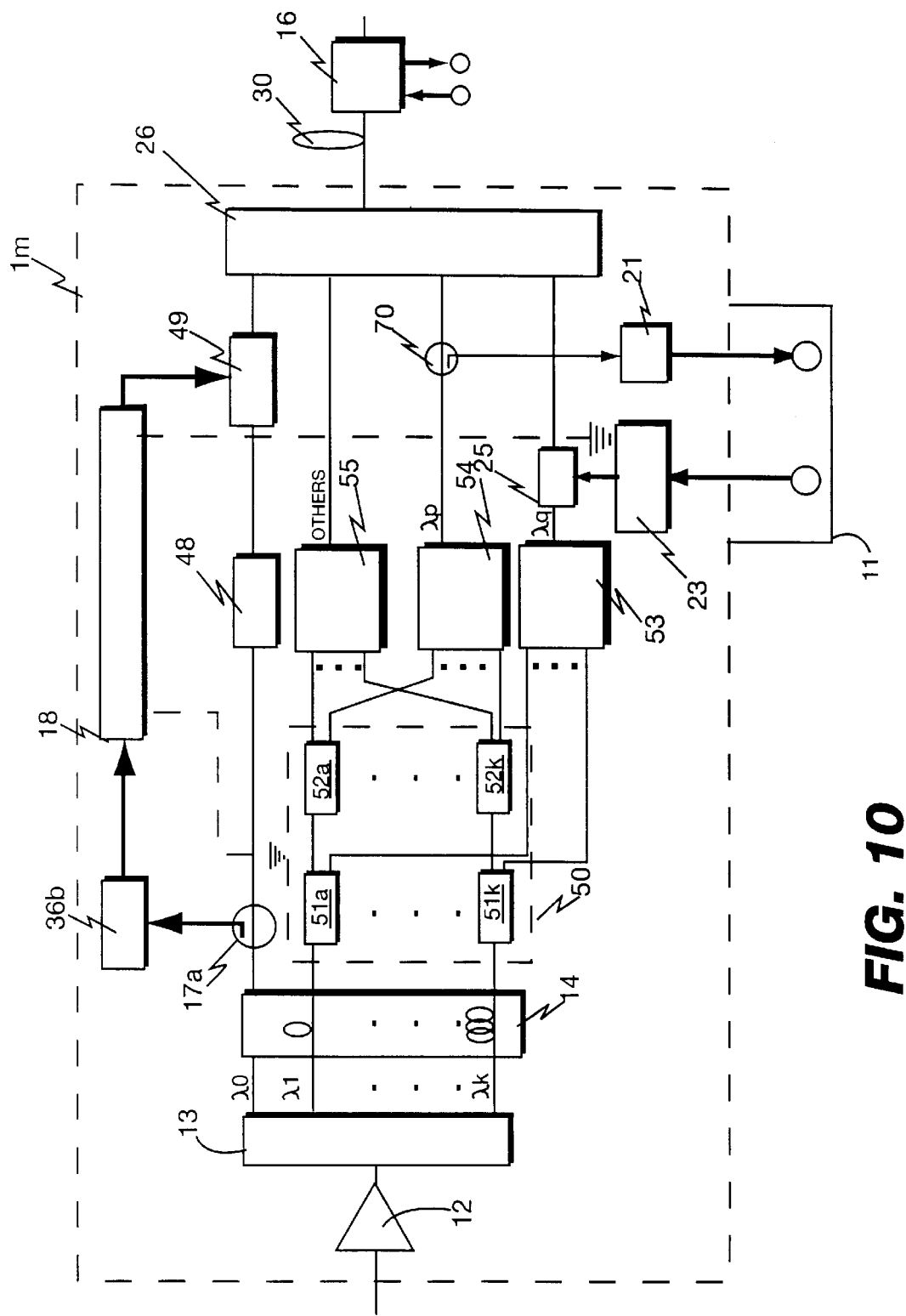
FIG. 10 is a block diagram showing schematically the structure of a terminal station according to a sixth embodiment of the invention.

Referring to FIG. 10, this embodiment differs in two respects from the first embodiment.

Firstly, in this embodiment, the signalling wavelength transmitter 19 is omitted, and the signalling wavelength receiver 17 of the first embodiment is replaced by a coupler 17a coupling to the signalling wavelength light path, the output of which is supplied to a receiver 17b (which functions identically to the receiver 17 in the first embodiment)

In this embodiment, the signalling wavelength path is continuous and leads through to the combiner 26.

Figures 11A, 11B:
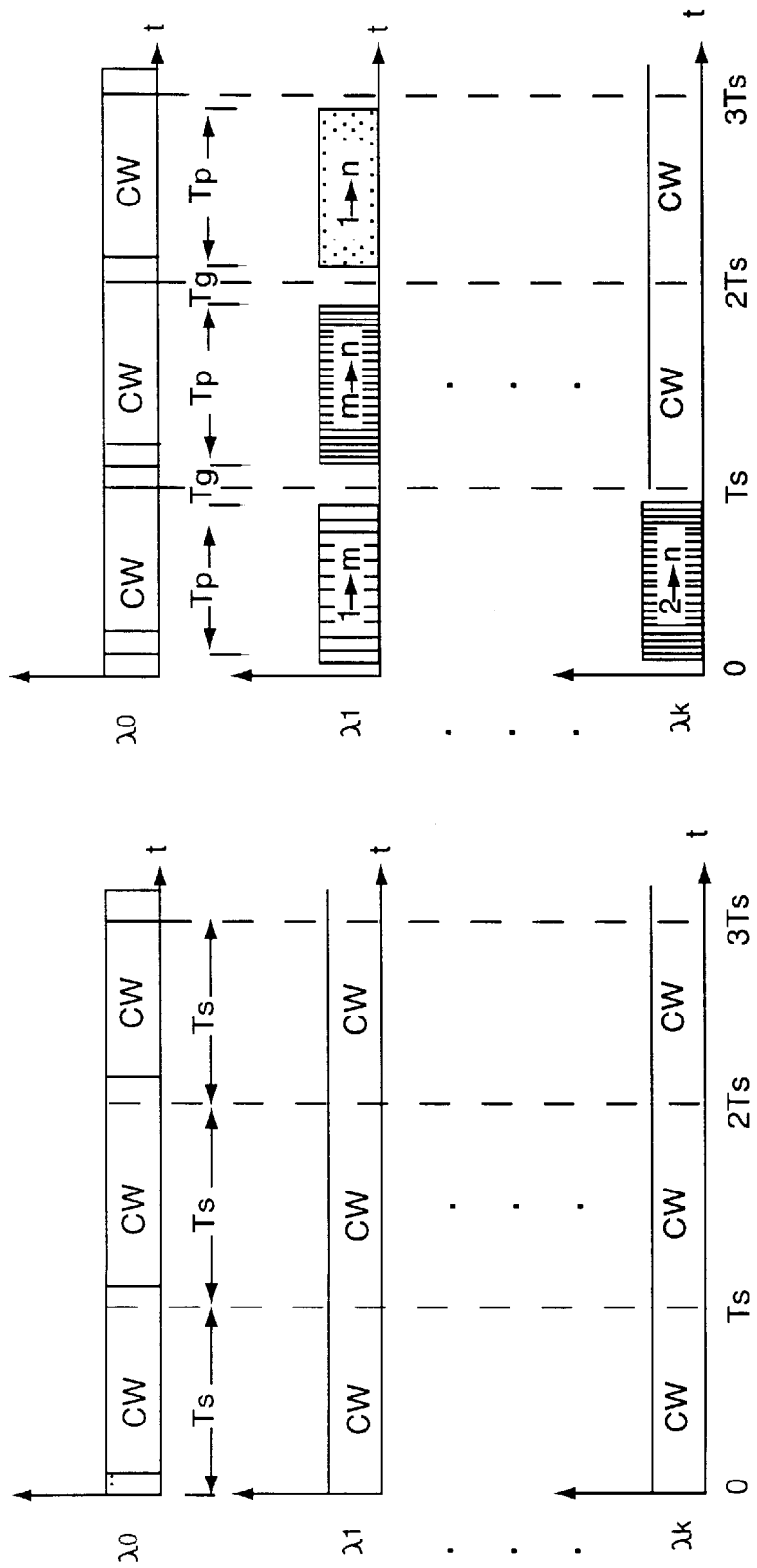
FIGS. 11a and 11b are diagrams showing the contents of the wavelengths of FIG. 3 over time at progressive intervals in a network according to the embodiment of FIG. 10.

Referring to FIGS. 11a and 11b, in this embodiment, the head station 2 operates the signalling wavelength laser diode 6-0 to generate the signalling wavelength $\lambda 0$ having an initial portion in each time slot in which any signalling data is present, followed by a continuous wave portion extending for the rest of each time slot.

In this embodiment, the signalling wavelength light path in the terminal stations 1 passes through a modulator 49 controlled by the processor 18, which is arranged to modulate part of the previously continuous wave portion of each time slot, when the terminal station 1 has data to transmit in the next time slot. Thus, as the signalling wavelength $\lambda o$ passes through successive terminal stations 1, the continuous wave portion in each time slot may progressively be filled by successive terminal stations in the network. The operation of the processor 18 in this embodiment will be described in greater details below.

The second difference between this embodiment and the first embodiment is in the structure of the routing means whereby the demultiplexed wavelengths are routed to the modulator 25 and coupler 20 (the component 24 is omitted from the diagram for clarity). Instead of the non-blocking optical switch 15 of FIGS. 2b and 5b, a bank 50 of optical switches is provided, having k inputs (where k is the number of wavelengths) and three groups of k outputs.

The bank 50 of switches comprises a first array 51a–51k of 1×2 optical switches each receiving one of the output optical paths of the wavelength demultiplexer 14 and providing two output paths. Each of the output ports of the switches 51a–51k is routed to a respective input port of a wavelength multiplexer 53 (e.g. a grating filter device or any of the other types of wavelength multiplexer disclosed above), the output of which passes to the modulator 25.

The other output port of each of the switches 51a forms the input to a respective one of a second array of optical 1×2 switches 52a–52k. One of the output ports of each of the second array of switches 52a–52k is supplied to a respective input port of a wavelength multiplexer 54, the output of which is supplied to the coupler 20. The other output port of each of the switches 52a–52k is connected to the respective inputs of a further wavelength multiplexer 55, the output of which passes straight to the combiner 26

Thus, when a data packet is to be transmitted the switch driver circuit 16 (omitted for clarity in FIG. 10) is controlled by the processor 18, to switch one of the switches 51 to pass the respective input wavelength to the wavelength multiplexer 53 and modulator 25, where it is modulated. All the other first switches 51 are controlled to route their outputs through the respective second switches 52, all or which are set to route their outputs to the wavelength multiplexer 55. The modulated wavelength is recombined with the others from wavelength multiplexer 55 at the combiner 25.

When the terminal station 1 is to receive a data packet, the processor 18 controls all of the first switches 51 to route their outputs to the respective second switches 52. The processor 18 causes the switch control circuit 16 to set one of the second switches 52 to route its output to the wavelength multiplexer 54, to the output of which the coupler 20 is connected, and to set all the other switches 52 to route their outputs to the wavelength multiplexer 55.

The tapped wavelength from the coupler 20 is recombined with all the others from the wavelength multiplexer 55 in the combiner 26.

In this embodiment, the gate circuit 22 is unnecessary because no data passes through the coupler 20 except when a data packet is to be dropped.

In this embodiment, it will be seen that if the terminal station 1 is inactive, i.e. the terminal station 1 is not either dropping a data packet or transmitting a data packet, all the data transmission wavelengths $\lambda_1$–$\lambda_4$ are routed through identical paths through the first switches 51 and second switches 52, and the wavelength multiplexer 55 and combiner 26, and accordingly all receive identical attenuation in the terminal station 1 (in contradistinction from the first and either the coupler 20 or modulator 25 even when the terminal station 1 is inactive)

Referring once more to FIG. 11a and FIG. 11b, in FIG. 11a it will be seen that the head station 2 in this embodiment generates a continuous wave signal on each of the data signalling wavelengths $\lambda_1$–$\lambda_k$ and generates on the signalling wavelength $\lambda_0$ a signal which contains signalling information at the start of each time slot (to synchronise the terminal stations 1) and continuous wave modulation thereafter. In FIG. 11b, the corresponding contents of the signalling and data transmission wavelengths are indicated for an arbitrary terminal station 1m. In the first time slot (t=0 to T) the processor 18 has previously learned (from data on the signalling wavelength $\lambda_0$ in the previous time slot) that a data packet from the first station will be arriving for that terminal station 1m on the wavelength $\lambda_1$. Accordingly, the processor 18 sets all the switches 51 to pass their outputs to the switches 52, and sets switch 52a to route its output to wavelength multiplexer 54 to route wavelength $\lambda_1$ to the coupler 20. All the other switches 52b –52k are set to route their outputs to the wavelength multiplexer 55. Accordingly, as previously described with regard to the earlier embodiments, the packet is read by the terminal station 1m.

Assuming now that the terminal station 1m contains in its memory 23 a data packet to be transmitted to a terminal station 1n. As in the first embodiment, the processor 18 observes the existence of a packet destined for station 1n in the first time slot and accordingly does not transmit in the first time slot. In the second time slot, the processor 18 decodes the signalling information from the signalling wavelength $\lambda_0$ and notes that all wavelengths are unoccupied in the second time slot (t=T to t=2T). Accordingly, the processor 18 controls the modulator 49 to modulate part of the continuous wave portion in the signalling wavelength in the first time slot, to write an indication that a data packet will be transmitted on wavelength $\lambda_1$ from station 1m to station 1n.

During the guard time $T_g$ after the end of the data packet in the first time slot and before the start of data packet transmission in the second time slot, the processor 18 controls the switch control circuit 16 to set switch 51a to route its output to the wavelength multiplexer 53 and modulator 25. All other first switches 51 are set to route their outputs to respective second switches 52, and all second switches 52 are set to route their outputs to the wavelength multiplexer 55. Accordingly, in the second time slot, whilst the processor 18 is receiving the signalling wavelength $\lambda_0$ the wavelength $\lambda_1$ is modulated to contain the packet from the memory 23 and all other wavelengths are passed without alteration.

It will be apparent that various modifications can be made to this embodiment. For example, the wavelength multiplexers 53/55 could be replaced by couplers (although the insertion loss would be higher). Likewise, multiple add and drop paths could be provided as in the earlier embodiments. The feature of modulating, rather than rewriting, the signalling channel could be employed without the switch structure described in this embodiment (and vice versa)

Thus, to summarise, in a first aspect of this embodiment the signalling wavelength is not terminated and rewritten at each node with a separate laser diode or other transmitter, but instead is passed and modulated (where necessary) at each terminal station 1 so as to progressively use up the continuous wave power thereof. This avoids the need for a stabilised light source at each terminal station 1.

In a second aspect, this embodiment provides routing of the data signalling wavelength to either an add path or a drop path, by spatially separating the data signalling wavelengths and employing an optical switch to route them, in which when the terminal station 1 is inactive all the data signalling wavelengths may be routed so as to bypass the drop path and the add path.

Seventh Embodiment

Figure 12:
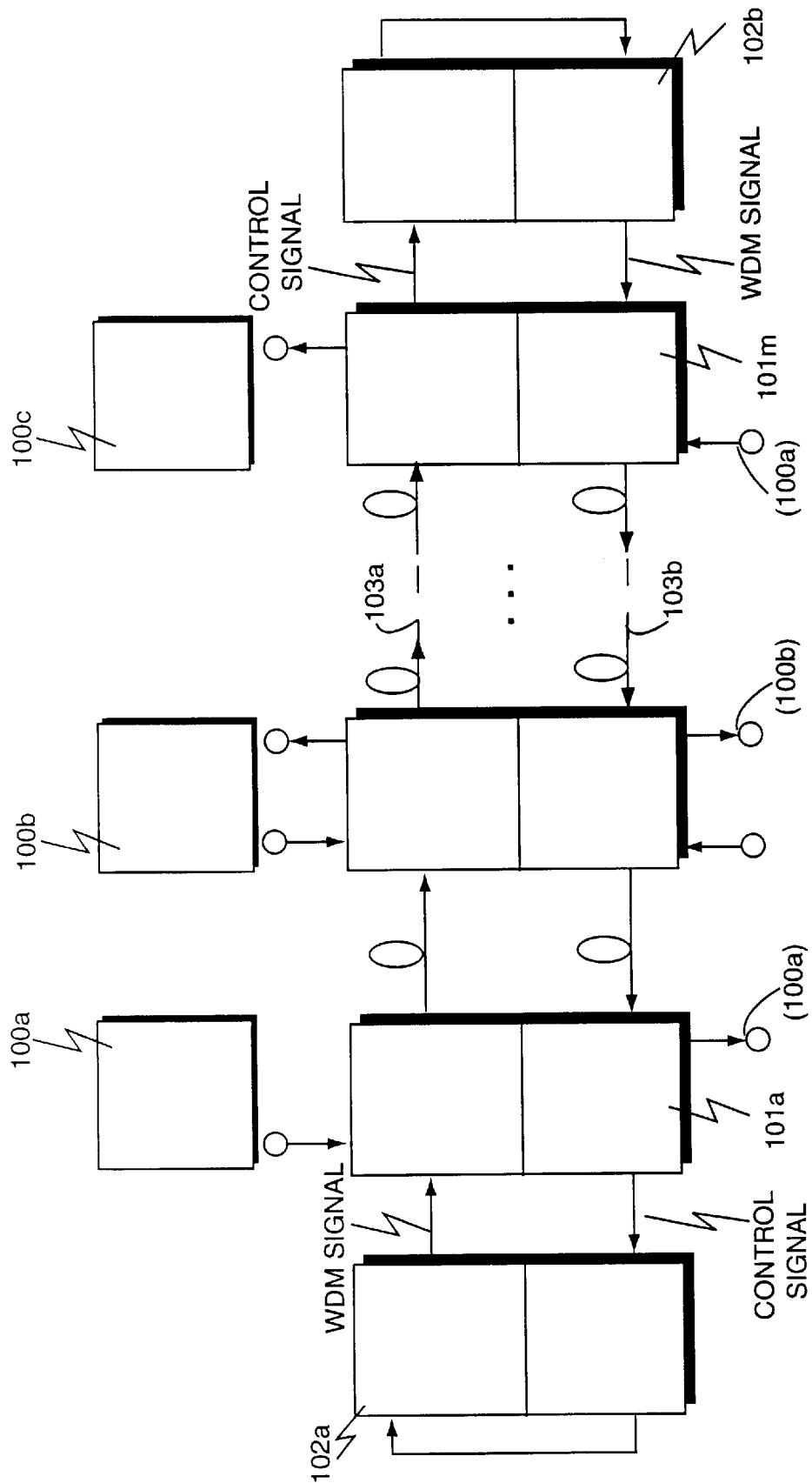
FIG. 12 shows a double bus network arrangement according to a seventh embodiment of the invention.

Referring to FIG. 12, in this embodiment the network illustrated in FIG. 1 is improved by providing a double bus structure comprising a first bus 103a and second bus 103b. A plurality of terminal stations 101a, 101b . . . are provided, each interconnected by optical fibre cable forming part of the bus 103a and optical fibre cable forming part of the bus 103b. The two buses 103a, 103b communicate data in opposite directions. At either end of the chain of interconnected terminal stations 101a–101m, before and after the first and last terminal stations, are a pair of head stations 102a, 102b.

Each of the terminal stations 101 comprises, essentially, two terminal stations as described in any of the foregoing embodiments; one for receiving and transmitting packets of data on the bus 103a, and one for receiving and transmitting packets of date on the bus 103b. Thus, in this embodiment, data can not only be signalled from a terminal station to any station downstream (i.e. further away from the head node) but in both directions. Accordingly, in this embodiment, the terminal equipment 100 is connected to both halves of the terminal station 101, and a simple decision circuit is provided to route data for transmission to one of the two halves depending on the location of the destination terminal station. In this embodiment, the structure of the terminal stations 101 is preferably somewhat simplified by providing only a single processor 18 shared by, and controlling, both halves of the terminal station, and making the decision as to which bus 103a or 103b to transmit a message on.

Of course, the furthest station along the bus 103a can only transmit data on the bus 103b, and the furthest station along the bus 103b can only transmit data along the bus 103a.

In this embodiment, the last terminal station 101a on the bus 103b is preferably arranged to communicate the signalling wavelength $\lambda_0$ to the processor 4 of the head station 102a of the bus 103a, and the last station 101m along the bus 103a is likewise preferably arranged to transmit the signalling wavelength of the bus 103a to the processor 4 of the head station 102b of the bus 103b. In this manner, any information on component failures or traffic conditions along one of the buses can be transmitted back to the head station of that bus via the other bus.

Thus, this double bus arrangement can be used to signal between terminal equipment 100 of equal status (for example a plurality of computer terminals)

Rather than employing two head end stations (one at either end of the bus), at the last terminal station 101m, the end of the bus 103a may be simply connected to the beginning of the bus 103b (in other words, the output optical port of one half of the terminal station 101m is connected by a loop to the input optical port of the other half), so that the buses 103a, 103b form a single continuous looped bus. In this arrangement, data can be transmitted in either direction along the looped bus (although stations further along the bus have less access to free wavelengths).

Eighth Embodiment

Figure 13:
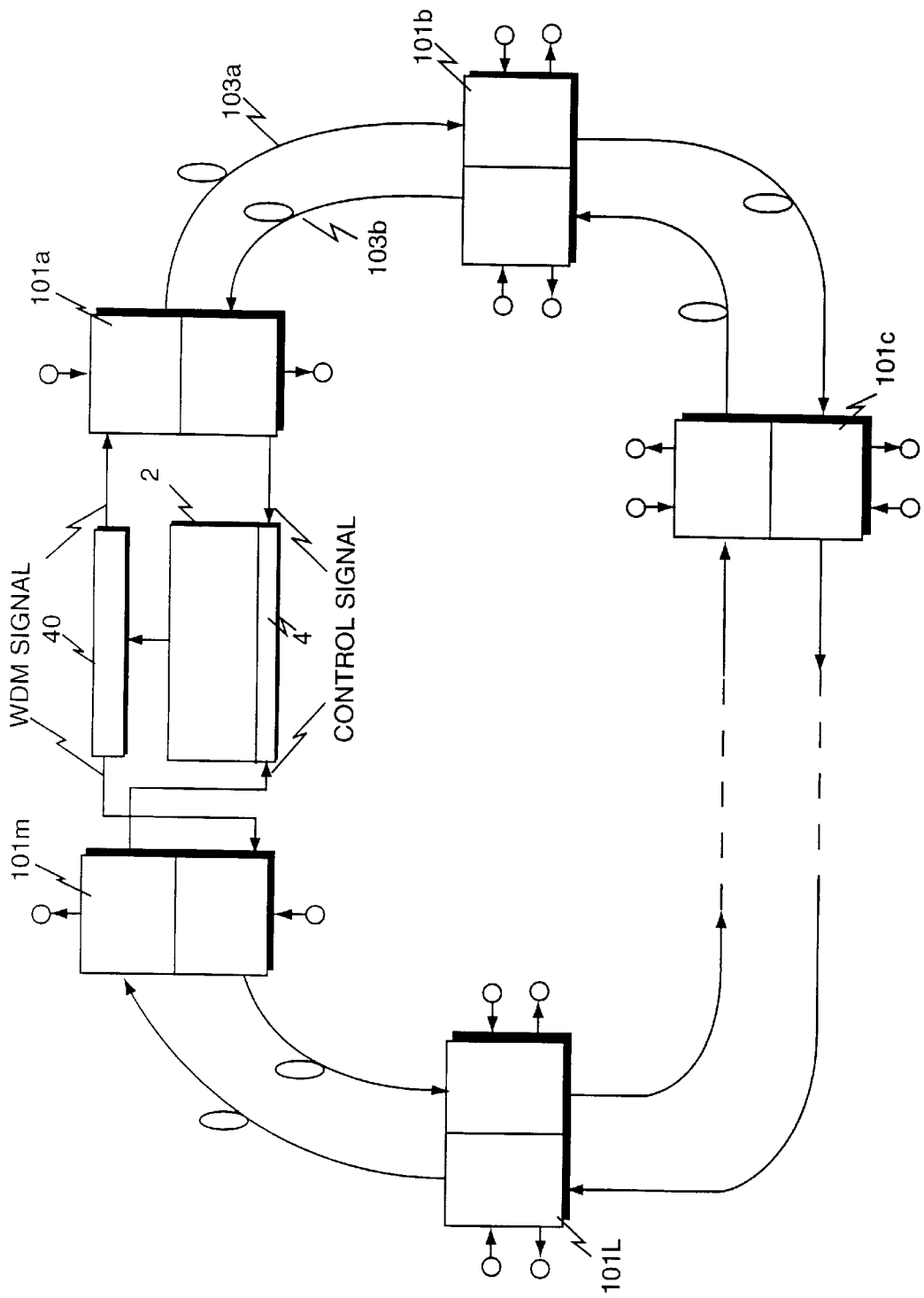
FIG. 13 shows a double looped bus arrangement according to an eighth embodiment of the invention.

Referring to FIG. 13, the structure of the bus of the preceding embodiment is modified to connect the last station on each bus with the first station on that bus. It would be possible to provide two head stations in this embodiment, as in the preceding embodiment. However, since the head station 2 in each case may simply be generating continuous wave wavelengths for each bus, a single head station 2 can be used to join both buses as shown in FIG. 13. The last terminal station (101m) along bus 103a is connected to the processor 4 of the head station, as in the preceding embodiment, to signal back any status information from terminal stations along the bus 103a. Likewise, the last terminal station 101a on the bus 103b is connected to the processor 4 for the same purpose. The wavelength division multiplexed signal generated by the head station 2 in this embodiment is supplied to a coupler 40 which splits the signal into two parts for transmission to the first station 101m of the bus 103b and the first station 101a of the bus 103a. In all other respects, this embodiment functions in the same manner as the preceding embodiment.

It will also be apparent that the single bus arrangement of FIG. 1 and the first embodiment could be connected in a loop, so that signalling information from the terminal stations of the bus 3 may be returned to the head station 2. In this case, it would be possible also for terminal stations (for example the last terminal station in the bus) to transmit data intended for earlier stations in the bus, if a further terminal station is provided within the head node 2 and data packets are decoded and wavelength translated for retransmission by the head station 2.

This embodiment may be made more efficient than the preceding embodiment, in that a single head node 2 can be employed to operate the two buses 103a, 103b, rather than a pair of head nodes 102a, 102b as in the preceding embodiment.

Ninth Embodiment

Figure 14:
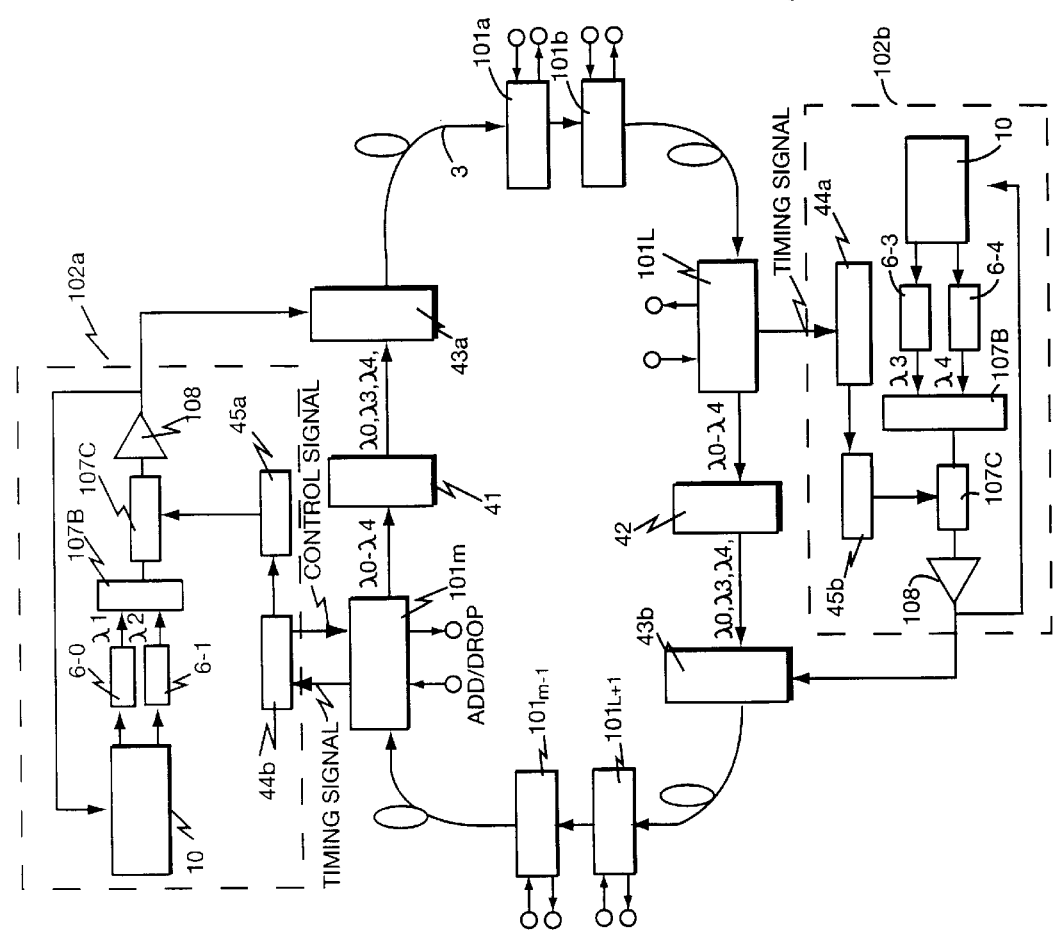
FIG. 14 shows a single looped bus arrangement according to a ninth embodiment of the invention.

In this embodiment, referring to FIG. 14, the bus 3 is connected in a ring configuration. The terminal stations in this embodiment may be as described in any of the first to fifth embodiments. The head stations 102a, 102b in this embodiment are as described hereafter.

In this embodiment, the two head stations 102a, 102b use different data transmission wavelengths. The head station 102a generates continuous wave signals on data wavelengths $\lambda_1$ and $\lambda_2$ using laser diodes 6-1 and 6-2; the other components of the head station 102a are as described in the second embodiment.

The head node 102b generates data transmission wavelengths $\lambda_3$ and $\lambda_4$ with laser diodes 6-3 and 6-4; the other components of the head station 102b are as described in the second embodiment.

The wavelength multiplexed continuous wave output of the head station 102a is coupled onto the bus 3 by a combiner 43a, and that of the head station 102b by a combiner 43b. Just before the combiner 43a is a band reject filter 41 which cuts the wavelengths $\lambda_1$ and $\lambda_2$, so that the preceding data modulated on the ring on these wavelenghts is terminated and does not continue to recirculate round the ring. Likewise, just before the combiner 43b in the bus 3 is a band pass filter 42 which rejects wavelengths $\lambda_3$ and $\lambda_4$, so that these wavelengths do not continue to circulate around the ring.

In this embodiment, since each of the terminal stations 1 includes means 19 for generating the signalling wavelength $\lambda_0$, neither of the head stations 102a or 102b requires such means.

At the start of the operation of this embodiment, the station 101m generates a signalling wavelength signal indicating that wavelengths $\lambda_1$ and $\lambda_2$ are free for transmission. It a terminal station 101a wishes to communicate with a station 101(L+1) it can therefore generate a packet on wavelength $\lambda_1$ as discussed in the foregoing embodiments, and regenerate the signalling wavelength $\lambda_0$ to indicate that this wavelength is not free in the next time slot.

Upon reaching the filter 42, the wavelengths $\lambda_1$ and $\lambda_2$ continue to circulate and so messages transmitted by preceding stations on these wavelengths continue to pass. Wavelengths $\lambda_3$ and $\lambda_4$ are blocked. At the station 101L the processor 18 of the station 101L generates on the signalling wavelength $\lambda_0$ an indication that wavelengths $\lambda_3$ and $\lambda_4$ are free for signalling, and downstream of this station 101L, continuous wave data transmission wavelengths $\lambda_3$ and $\lambda_4$ are inserted combiner 43b for use by the subsequent stations 101(L+1) etc.

Timing signals from the terminal stations 101L and 101m are transmitted to the processors 44a and 44b of the head stations 102a and 102b to synchronise the time slots in the wave lengths $\lambda_3$, $\lambda_4$ with those in the wavelengths $\lambda_1$, $\lambda_2$.

In this embodiment, new continuous wave wavelengths free for transmission are added to the bus 3 part way along the bus, at the station 101L. Thus, in this embodiment, the terminal stations following the station 101L have the same likelihood of access to a free data transmission wavelength as those earlier in the bus; this is an improvement over the bus of the first embodiment, in which the data transmission wavelengths become progressively filled along the length of the bus.

It would be possible, as in the above described embodiments, to provide for the ring to consist of two parallel buses running in opposite directions and for each terminal station likewise co consist of parallel circuits for operating on each bus.

Tenth Embodiment

Figure 15:
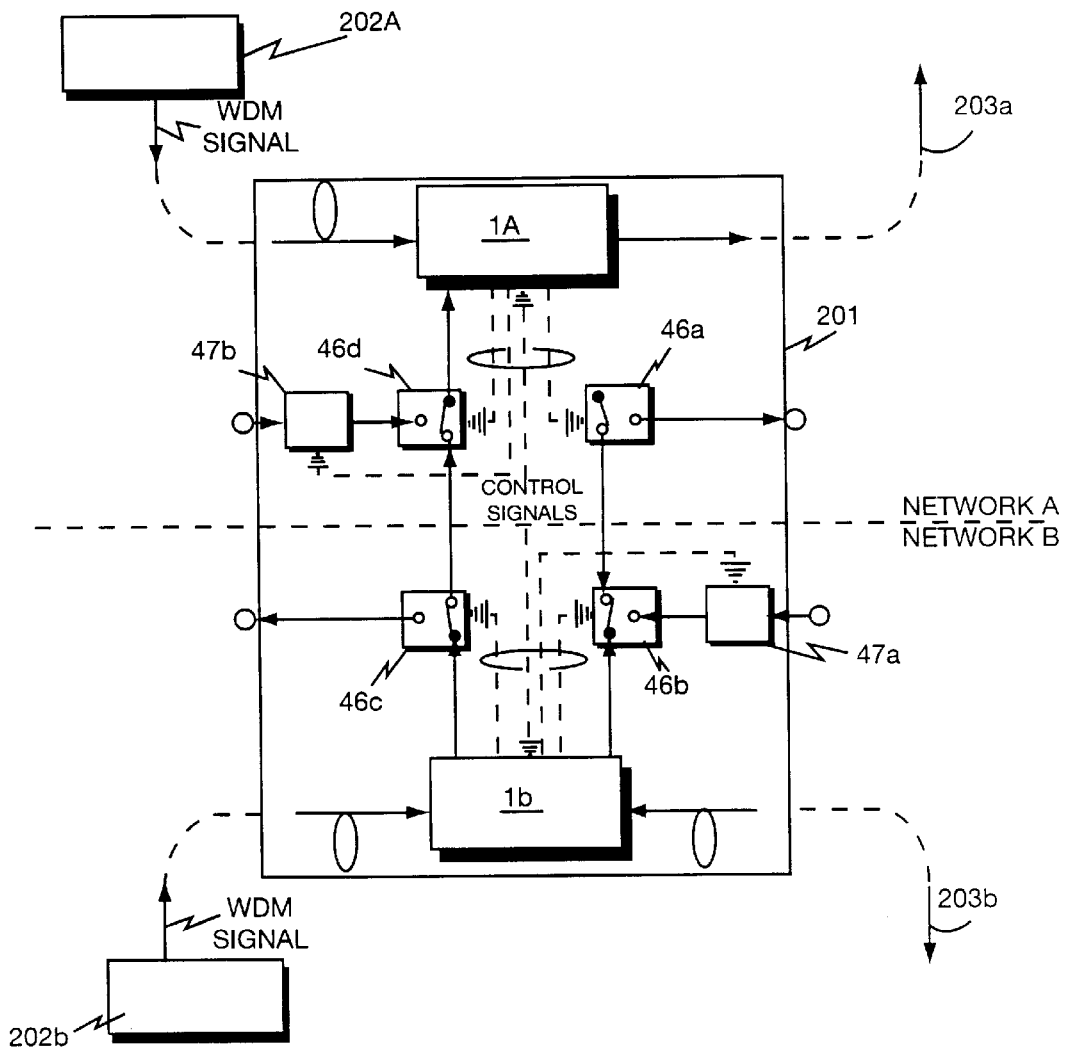
FIG. 15 is a block diagram illustrating schematically the employment of a terminal station according to a tenth embodiment of the invention to link between several different communications networks.

Referring to FIG. 15, in this embodiment, connection between several different optical WDM networks is disclosed.

A single terminal station 201 may act as a link between two buses 203a, 203b, which may use different communications wavelengths. In this case, the electrical input and output ports of a station 1a on the bus 203a and on station 1b on the bus 203b are, rather than being routed directly to terminal equipment 100, routed via switches 46a–46d and input memory buffers 47a, 47b. One terminal of the output port switch 46a of the terminal station 1a is linked to the other switch port of the input switch 46b of the terminal station 1b, and vice versa. Thus, a data packet received at the terminal station 1a of the bus 203a can be routed to the terminal station 1b of the bus 203b, and vice versa; incoming signals from terminal equipment 100 in this case are accordingly stored in the buffer memories 47a, 47b for transmission after the link between the buses 203a, 203b has been completed.

The two terminal stations 1a, 1b may be physically collocated in a single terminal station 201 linking the two buses 203a, 203b, or they could be separated and interconnected by communications lines. In the former case, a single Processor 18 may be provided to operate both the terminal stations 1a and 1b ; otherwise, the two terminal stations 1a, 1b are appropriately arranged to exchange timing signals.

Eleventh Embodiment

Figure 16:
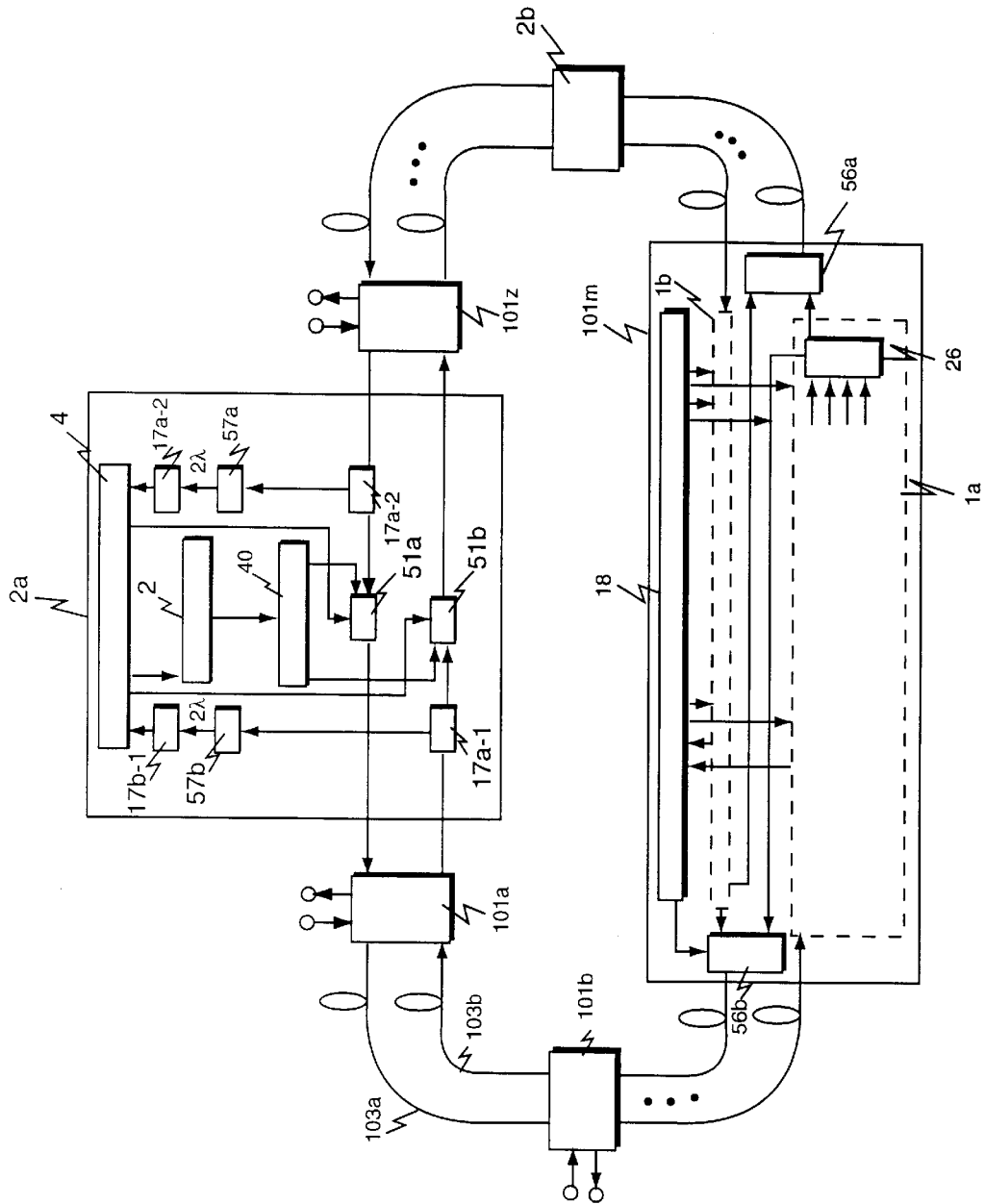
FIG. 16 is a block diagram illustrating schematically a double bus network arrangement according to an eleventh embodiment of the invention.

Referring to FIG. 16, in this embodiment, the double bus structure of FIG. 12 and FIG. 13 is employed. However, each of the terminal stations 101 is able to communicate with any other terminal station, because the head station 2a in this embodiment includes a switch 51a on the bus 103a and a switch 51b on the bus 103b, the switch having a position in which the wavelength multiplexed optical signal is transmitted straight through the head station and a switch position in which the head station supplies continuous wave data transmission wavelengths as in the above described embodiments.

In operation, initially each of the switches 51a, 51b is set to connect the output of the optical power splitter 40 (as described above in relation to the eighth embodiment) to supply continuous wave optical signals to each of the optical fibre buses 103a, 103b, which run in opposite transmission directions round the ring of terminal stations 101a, 101b, . . . 101m . . . 101z.

After generating one time slot of data transmission wavelengths and signalling wavelength $\lambda_0$, the head station 2 15 closes the switches 21a , 51b and thus permits the wavelength multiplexed optical signals from the last station 101z to pass through the head station 2 to the first terminal station 101a. Thus, the station 101z (or any other terminal station) can transmit data through the head station 2 to any terminal station (e.g. 101a ) earlier in the ring. The control circuit 4 thus alternately opens and closes the switches 51a, 51b.

In this embodiment, a single bus 103a is thus sufficient to communicate data from any one terminal station to another in the ring. However, a further bus 103b is provided to allow for fault tolerance in the event of failure of a terminal station or optical fibre cable between terminal stations. Also, as shown, a second head station 2 (identical to the first) is provided, the switches 51a, 51b thereof being normally closed so that the terminal station 2 is transparent to transmissions on either bus 103a or 103b.

in this embodiment, each of the terminal stations is of the form of the terminal station 101m , which comprises a first terminal station portion 1a connected within the bus 103a and a second terminal station portion 1b connected within the bus 103b. Each of the terminal station portions 1a, 1b is the same as that in any one of the first, third, fourth, fifth or sixth embodiments, except that they lack a processor, and a single processor 18 as provided to control both.

Each terminal station also comprises a pair of cross coupling switches 56a, 56d, both controlled by the processor 18. The switch 56a routes the output of the first terminal station portion 1a either to the bus 103a or the bus 103b, and the switch 56b routes the multiplexed optical output of the second terminal station portion 1b to either the second bus 103b or the first bus 103a. Normally, the processor 18 maintains both switches 56a and 56b open, so that the output of the first terminal portion 1a is connected to the first bus 103a and that of the second terminal portion 1b to the second bus 103b.

Figure 17A:
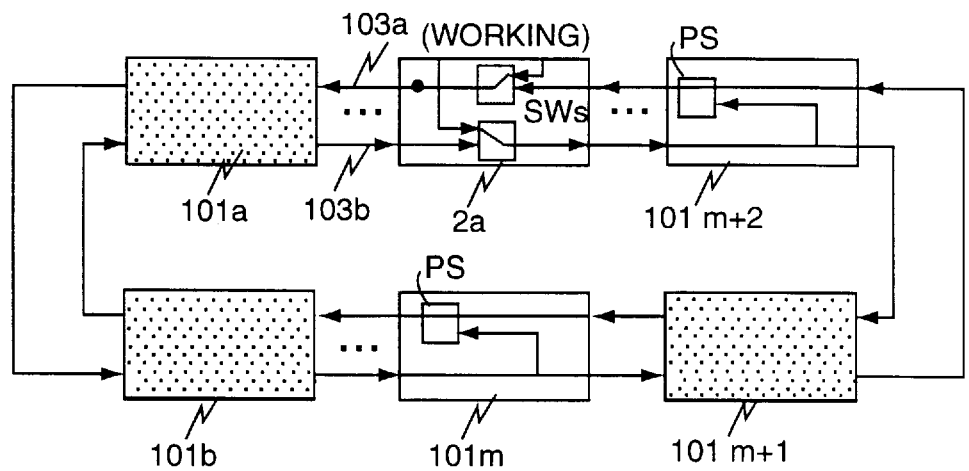
FIGS. 17a and 17b are block diagrams of the eleventh embodiment showing the operation of that embodiment in isolating a defective terminal station.
Figure 17B:
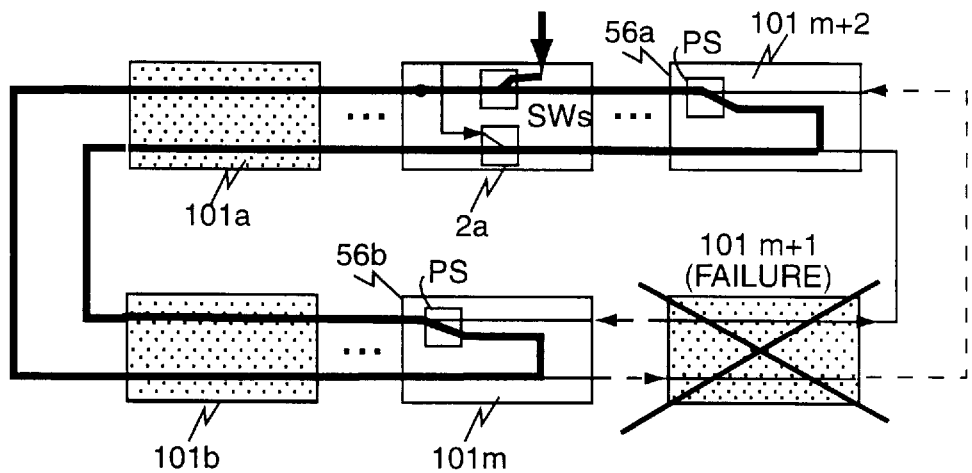

Referring to FIGS. 17a and 17b, when a terminal station 101(m+1) fails, the switch 56b of the terminal station 101m is operated to connect the bus 103a on to the bus 103b at that station, and the switch 56a in the mode 101(m+2) is operated to connect the bus 103b on to the bus 103a at that terminal station. Thus, the failed terminal station 101(m+1) is isolated, and the two buses now form one single continuous ring 103, along which any terminal station can communicate with any other.

In this embodiment, preferably there are provided two head stations 2a, 2b. One of the stations 2a is normally active, and the other is normally inactive (i.e. acts as a transparent link in the buses 103a and 103b). In the event of failure of the light sources in the first head station 2a, the role of the two head stations can be reversed so that the second station 2b becomes active.

In the event of a failure affecting the switches 51a, 51b in the first head station 2a, so as to break the path through the station, the switches 56a, 56b of the adjacent terminal stations 101a, 101z can be operated as described above with reference to FIGS. 17a and 17b to isolated the defective head station 2a. The system can then continue to operate with the remaining head station 2b in a single ring.

In this embodiment, the terminal stations 101 are arranged to transmit information indicating station failure, for example on the signalling wavelength $\lambda_0$.

The propagation time, in this embodiment, of the signal around the ring needs to exceed the length of each time slot T.

It will be apparent that the two features of this embodiment (namely, providing a head station which can pass data transparently, so that data can recirculated twice round a ring, and providing a pair of buses together with isolation switches enabling the selective isolation of defective stations) can be used separately of each other, and separately of the distinguishing features of other embodiments. They might also be used with other types of WDM communication system (for example that of EP0452895).

Twelfth Embodiment

Figure 18:
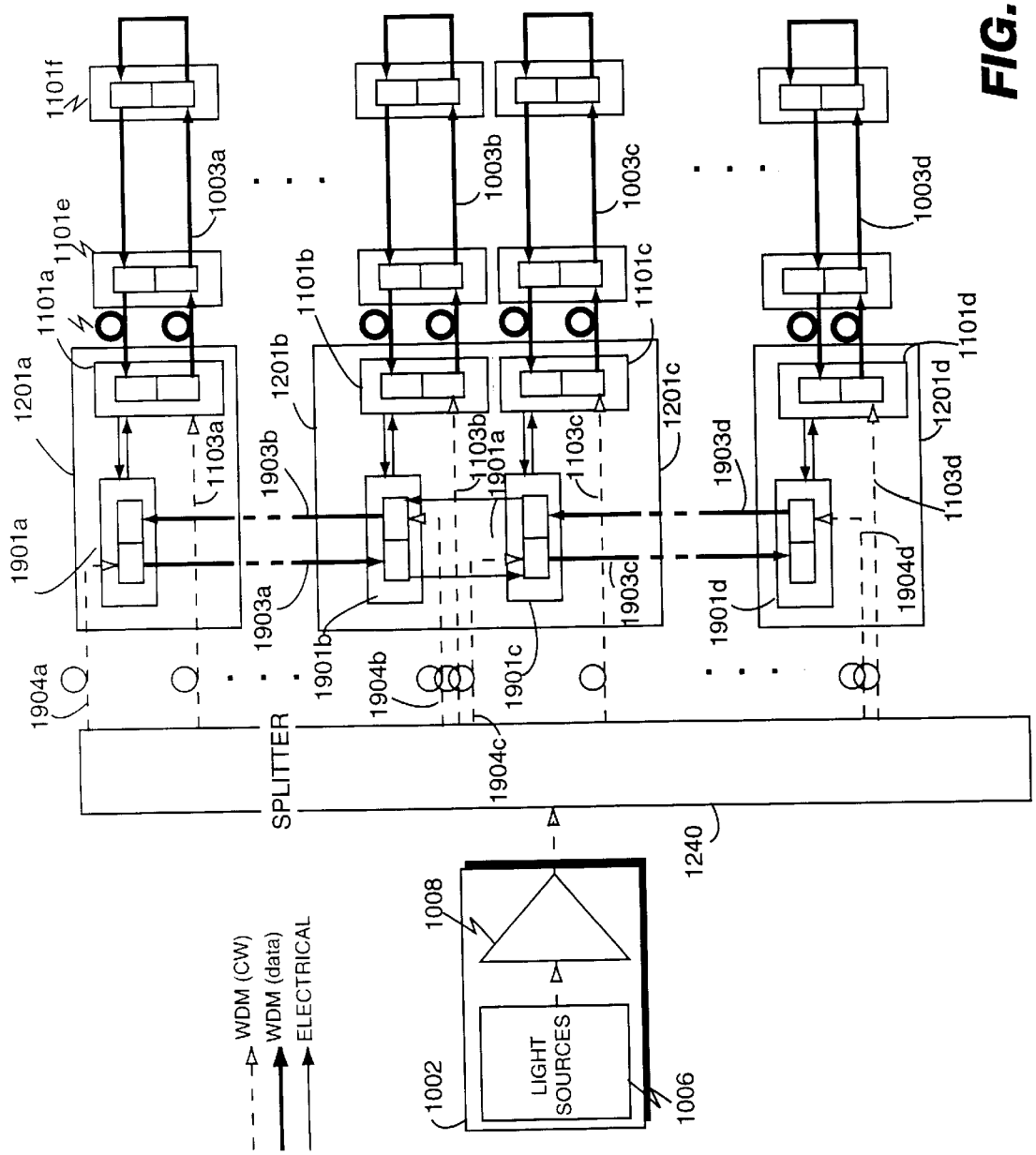
FIG. 18 is a block diagram of a star network arrangement according to a twelfth embodiment of the invention.

Referring to FIG. 18, a twelfth embodiment of the invention will now be described.

In preceding embodiments, a bus or ring structure has been disclosed. In this embodiment, the number of terminal stations which may be used is further increased, without increasing the number of light sources or available wavelengths, by connecting several such structures in a star arrangement.

In FIG. 18, a head station 1002 comprises a plurality of light sources (for example 5) indicated as 1006 generating different wavelengths $\lambda_0-\lambda_k$, the outputs of which are multiplexed together as in the above embodiments to provide a wavelength division multiplexed signal which is amplified by a optical amplifier 1008.

The amplified optical signal is fed to a splitter 1240 (for example a 1:128 splitter) which splits the WDM signal evenly between a plurality (for example 128) of optical output ports. The gain of the optical amplifier 1008 is such as to compensate for the splitter loss (which may for example be around 24 dB).

Connected to a plurality (for example 120) of the optical output ports of the splitter 1240 are a corresponding plurality of optical fibre cables 1103a, 1103b, 1103c, 1103d which each provide the input to a respective terminal station 1101a, 1101b, 1101c, 1101d forming half of a respective bus head end station 1201a, 1201b 1201c, 1201d.

Each of the terminal stations 1101a–1101d corresponds to the terminal stations 101 of FIG. 12 or FIG. 13 and consists of two halves each half for signalling in a different direction. The optical cable 1103a is routed through a first side of the first terminal station 1101a, and forms an optical bus 1003a which interconnects a plurality of equivalent terminal stations 1101e . . . 1101f (for example 30 terminal stations)

At the endmost terminal station 1101f of the bus 1003a, the bus 1003a is routed back from the output port of the first side of the terminal station 1001a to the input port of the second side of the terminal station so that, unlike the bus structure shown in FIG. 12, no head end station beyond the final terminal station 1101f is required. Thus, in this embodiment, the bus 1003a forms a loop starting (at the first side) and ending (at the second side) at the terminal station 1101a. The same is true of the optical buses 1003b, 1003c, 1003d etc.

Also comprised within each bus head end station 1201a–1201d is a head end terminal station 1901a–1901d, respectively. Each of the head end terminal stations 1901a–1901d also corresponds to the terminal stations 101 of FIG. 12 or FIG. 13 and comprises two sides, one for communicating in each direction. The head end terminal stations 1901a–1901d (equal in number to the number of buses, for example 120) are interconnected by first and second optical connection buses 1903 running in opposite directions; in this case, a first group of 60 bus head end stations 1901a–1901b are interconnected by a first bus 1903a running in a first direction, and a second bus 1903b running in a second direction, and a second group of 60 bus head end stations is interconnected by a first optical bus 1903c running in a first direction and a second optical bus 1903d running in the opposite direction.

Each of the bus head end stations 1901a–1901d corresponds in structure to the station 201 shown in FIG. 15, there being provided electrical connection paths between the electrical input port of the terminal stations 1101 and electrical output port of the head end terminal stations 1901, and vice versa. Thus, data can be communicated from a terminal station on one bus 1003a to a terminal station on another bus 1003b, via the bus head end stations 1201a, 1201b and connection bus 1903a.

A head end terminal station 1901b connected to the first and second connection buses 1903a, 1903b is similarly electrically connected to a second head end terminal station 1901c on the third and fourth connection buses 1903c, 1903d.

Continuous wave modulated light is supplied to the connection buses 1903a–1903d via cables 1904a–1904d from optical output ports of the splitter 1240.

Thus, in this embodiment, terminal stations 1101 are interconnected by optical communication buses 1003, the communication buses themselves being interconnected by one or more connection buses 1903. A single set of stabilised light sources 6 provides optical power for all the optical buses 1103, 1903 via a splitter 1240. Addressing logic is provided at each head end node station 1201, to enable it to drop data from a connection bus and add data to a communication bus 1103, and vice-versa. This embodiment is able to interconnect about 3600 terminal stations 1101. Various modifications may be made to this embodiment. For example, the connection buses 1903 may be omitted and each pair of optical buses 1003a –1003d may be directly connected to its neighbours by stations of the type disclosed in the tenth embodiment. More than one set of stabilised light sources 6 may be provided.

In this embodiment, the length of each of the communication buses (i.e. the number of terminal stations in the bus affects the loss along the bus, and hence for longer buses, more optical power is required to be supplied to each bus. Treating the optical power supplied from the light sources 1006 as a fixed constraint, reducing the number of terminal stations in each bus increases the losses which are acceptable in the splitter 1240, and hence the number of stages which the splitter can have (which is exponentially related to the number of buses which can be supported by the splitter). Thus, relatively short buses and a relatively high number of buses may be a preferred structure for some applications.

Thirteenth embodiment

This embodiment is based on the preceding embodiment, and includes additional features providing security against failure of a system components (e.g. breaks in the cable, or failures of light sources or terminal stations)

Figure 19:
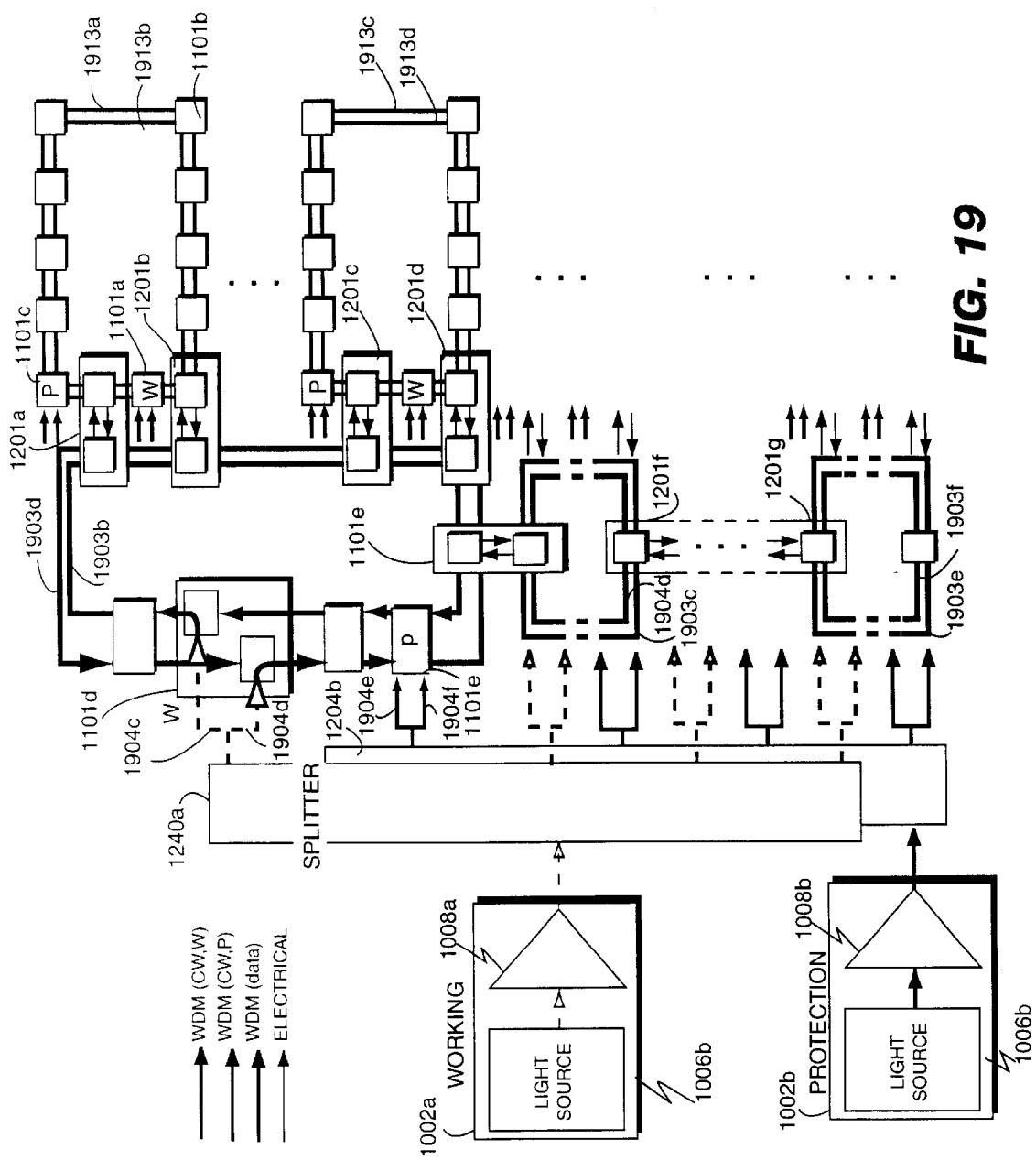
FIG. 19 is a block diagram of a star network comprising a thirteenth embodiment of the invention.

Referring to FIG. 19, in this embodiment, terminal stations 1101 are interconnected by a double ring bus structure, as in the eighth and eleventh embodiments, so that a terminal station 1101a can communicate with a terminal station 1101b either via a first optical fibre ring 1913a, or via a second optical fibre ring 1913b in the opposite direction round the ring to the first.

Each terminal station 1101 has the same structure as in the eleventh embodiment, so that if both fibre rings 1913a and 1913b break between two terminal stations, or if a terminal station fails, the two terminal stations to either side of the defect can be reconfigured to interconnect the two rings 1913a, 1913b into a single looped bus, maintaining full communication between all undamaged terminal stations. If only one ring breaks, communication can proceed normally on the other without such reconfiguration.

In this embodiment, the head end terminal station 1101a of a communication ring bus therefore receives two optical fibre cables 1904a, 1904b (not shown in FIG. 19) from two ports of the splitter 1240a. The head end station 1101a corresponds in structure to head end station of FIG. 13, but without the light source 6 and splitter 40 thereof (these being replaced by the light sources 1006a and splitter 1240a)

Additionally, to safeguard against failure of the light sources 1006a, splitter 1240a, cables 1904a and 1904b or station 1101a, a secondary optical power supply system is provided comprising secondary light sources 1006b identical to the primary light sources 1006a (which correspond to those 1006 of the twelfth embodiment); and secondary amplifier and splitter components 1008b, 1240b and optical supply cables fibres (not shown). Two ports of the secondary (protective) splitter 1240b are connected via optical fibre cables to a secondary head end station 1101a (on the same ring as the first head end station 1101a), which is normally configured as a transparent stage in the buses 1913a, 1913b. In the event of failure of the primary optical power supply system comprising the light sources 1006a, splitter 1240a, and primary head end node 1101a, the secondary head end node 1101c is activated (e.g. by a predetermined data signal) to supply optical signals from the light sources 1006b to the optical rings 1913a, 1913b.

Interconnection between the terminal stations on the double ring bus 1913a, 1913b and terminal stations on another double ring bus (for example, that comprised by optical fibre rings 1913c, 1913d) is provided via interconnection ring bus structures 1903a, 1903b; 1903c, 1903d; 1903e, 1903f.

Connection between the communication ring bus 1903a, 1903b and the interconnection ring bus 1903a, 1903b is provided by a pair of interconnection node stations 1201a, 1201b, one of which is normally inactive (in which condition it functions as a transparent node on the communication double ring and the interconnection double ring). Each interconnection station 1201a, 1201b consists of a pair of terminal stations, one on each bus, electrically interconnected as in the tenth embodiment. On failure of one interconnection node station 1201a, communication is maintained by activating the second connection node station 1201b.

Each of the interconnecting ring buses 1903a, 1903b is supplied with a WDM optical single at a primary head node 1101d (functionally identical to the primary head node 1101a) receiving light via a pair of optical fibre cables 1904c, 1904d from the primary splitter 1240a, and a secondary head end node 1101e (functionally equivalent to the secondary head node 1101c) receiving light via a pair of optical fibre cables 1904e, 1904f from the secondary splitter 1240b.

Preferably, a number of such interconnection double rings are provided (1903c, 1903d; 1903e, 1903f), and, as in the preceding embodiment, adjacent rings are interconnected by interconnection stations 1201e, 1201f, 1201g (functionally equivalent to the interconnection stations 1201a, 1201b) A pair of such interconnection stations (not shown) may be provided, to give redundancy.

Thus, in this embodiment, the arrangement of discrete buses or rings into a star arrangement, sharing a common light source, is further improved by the provision of a duplicate ring structure in each of the communication and interconnection buses, giving protection against failure of one or both optical fibre cables making up each double ring, or against failure of a terminal station. Duplicate (redundant) interconnection between each communications ring and each interconnection ring protects against failure of the interconnection stations between the two. Provision of duplicate optical WDM signal sources gives protection against light source or optical cable failure.

It will be apparent that these features may individually be employed separately of each other, and that they are illustrated together in FIG. 19 merely for convenience.

Other Modifications and Embodiments

It will be clear from the foregoing that many other modifications, substitutions and embodiments are possible. For example, other network configurations than those described are possible (e.g. as disclosed in WO93/21706, incorporated herein by reference)

Rather than using a separate signalling wavelength $\lambda_o$, it would be possible to use subcarriers (e.g. TDM positions of the each of the data signalling wavelengths modulated by a radio frequency, or the like) as disclosed in the above referenced Chlamtac paper, or TDM portions of the data signalling wavelengths, to transmit the signalling information discussed above.

Rather than transmitting the signalling information in one time slot to indicate the contents of the next time slot, the signalling information in one time slot could indicate the contents of the next but one or subsequent data transmission time slots. Equally, it would be possible to insert a one time slot delay line in each terminal station 1, as disclosed in the above referenced Chlamtac paper, and to transmit the signalling information simultaneously with the data transmission information to which it relates, the signalling information being extracted prior to imposition of the delay.

Rather than employing a plurality of light sources 6-0 to 6-k at each head station, it would be possible to use the structure described in EP 0452895 in which a single laser component is used to generate a plurality of different wavelengths.

Although it is preferred to use passive modulation of the data transmission wavelengths as disclosed above, the possibility of using controlled retransmission with data transmission light sources at terminal stations is not excluded in all aspects of the invention.

In the foregoing, unless expressly indicated to the contrary, each feature of each embodiment may be combined with those of each other embodiment in a manner apparent to the skilled person.

In this document, the terms "light" and "optical" are intended not only to refer to the visible spectrum but also to any wavelengths which obey the laws or optics in substantial fashion.

It will be understood from the foregoing that the invention comprehends each and every novel feature and subcombination of features disclosed in the foregoing, together with all obvious variants and modifications thereof. Accordingly, the scope of the invention will be understood not to be limited by the above examples but to extend to all equivalents thereof, whether or not within the scope of the accompanying claims.

Connectivity

The maximum number of terminal stations in this invention is not limited to the number of different light wavelengths available. It is affected by the number of light sources, however. In fact, it may be found that a larger number of data signalling wavelengths can actually reduce the maximum number of terminal stations which can be supported by a single head station, because the fraction of the total optical power on each wavelength is reduced and consequently the signal to noise ratio is likewise reduced.

To give some concrete examples, making sensible assumptions about the loss of various components, it is estimated that using four different data transmission wavelengths (k=4), 1,000 terminal stations can be supported by a single head station at 155 Mbit/s data rate with an achieved capacity of 620 Mbit/s; 61 terminal stations can be supported at 2.5 Gbit/s data rate with an achieved capacity of 10 Gbit/s; and 15 terminal stations can be supported at 10 Gbit/s with an achieved capacity of 40 Gbit/s. When the number k of data signalling wavelengths is increased to 16, the number of terminal stations supported decreases to 292, 16 and 2 respectively. The number of terminal stations which can be supported may be increased by reducing the loss at each terminal station, and through other measures.

It will thus be apparent from the foregoing that the invention can enable the use of a relatively small number of wavelengths to support a much larger number of terminal stations.

I claim:

1. A wavelength multiplexed optical communication system comprising:

a plurality of terminal stations and at least one head station interconnected by a pair of rings comprising a pair of optical communications buses carrying data in opposite directions, the head station providing optical signals on a plurality of optical carriers, and the terminal stations each modulating the optical carriers to carry data signals, the terminal stations each comprising means for interconnecting said buses, the system thereby being operable as a single continuous bus in the event of a system or component failure.

2. A system according to claim 1, wherein there are provided a plurality of said buses, connected to one another.

3. A wavelength multiplexed optical communication system comprising:

a plurality of terminal stations and at least one head station interconnected by a pair of rings comprising a pair of optical communications buses carrying data in opposite directions, the head station providing optical signals on a plurality of optical carriers, and the terminal stations each modulating the optical carriers to carry data signals, the terminal stations each comprising means for interconnecting said buses, the system thereby being operable as a single continuous bus in the event of a system or component failure, wherein there are provided a plurality of said buses connected to one another and the number of said head stations is less than the number of said buses, and there is provided a splitter arranged to split light from each said head station to a plurality of said buses.

4. A system according to claim 1, wherein said plurality of buses are connected to one another by at least one further bus.

5. A wavelength multiplexed optical communication system comprising:

a plurality of terminal stations and at least one head station interconnected by a pair of rings comprising a pair of optical communications buses carrying data in opposite directions, the head station providing optical signals on a plurality of optical carriers, and the terminal stations each modulating the optical carriers to carry data signals, the terminal stations each comprising means for interconnecting said buses, the system thereby being operable as a single continuous bus in the event of a system or component failure, wherein there are provided a plurality of said buses connected to one another, and the interconnection between said buses is provided by electrical communications paths between terminal stations of said buses.

6. A system according to claim 2, wherein connections are provided to primary and secondary points in each bus, the secondary connection point being usable in the event of failure of said primary connection point.

7. A system according to claim 1, comprising primary and secondary light sources connected to the same bus, the secondary light source providing light to said bus in the event of failure of said primary light source.

8. A wavelength multiplexed optical communication system comprising:

a plurality of terminal stations and a head station interconnected by a pair of optical communication rings, each of said pair of rings carrying data in opposite directions, said head station providing optical signals on a plurality of optical carriers, and the terminal stations each modulating the optical carriers to carry data signals, the terminal stations further interconnecting said rings whereby the system is operable as a single continuous ring in the event of a system or component failure.

* * * * *